(12) United States Patent
Fukuta et al.

(10) Patent No.: US 9,036,275 B2
(45) Date of Patent: May 19, 2015

(54) IMAGE OPTICAL SYSTEM, IMAGING DEVICE, AND DIGITAL APPARATUS

(75) Inventors: Yasunari Fukuta, Osaka (JP); Keiji Matsusaka, Osaka (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/127,848

(22) PCT Filed: May 29, 2012

(86) PCT No.: PCT/JP2012/003485
§ 371 (c)(1),
(2), (4) Date: Dec. 19, 2013

(87) PCT Pub. No.: WO2012/176379
PCT Pub. Date: Dec. 27, 2012

(65) Prior Publication Data
US 2014/0139698 A1   May 22, 2014

(30) Foreign Application Priority Data
Jun. 24, 2011   (JP) .................................. 2011-140638

(51) Int. Cl.
| | | |
|---|---|---|
| G02B 9/60 | (2006.01) | |
| G02B 3/02 | (2006.01) | |
| G02B 13/00 | (2006.01) | |
| H04N 5/232 | (2006.01) | |

(52) U.S. Cl.
CPC ........ G02B 13/0045 (2013.01); H04N 5/23245 (2013.01)

(58) Field of Classification Search
USPC ......................................... 359/714, 763, 764
See application file for complete search history.

(56) References Cited

U.S. PATENT DOCUMENTS

| | | |
|---|---|---|
| 2010/0214467 A1 | 8/2010 | Ohtsu |
| 2010/0220229 A1 | 9/2010 | Sano |
| 2010/0253829 A1 | 10/2010 | Shinohara |
| 2011/0013069 A1 | 1/2011 | Chen |
| 2011/0188131 A1 | 8/2011 | Sano |
| 2011/0310287 A1 | 12/2011 | Ohtsu |
| 2011/0310494 A1 | 12/2011 | Ise et al. |
| 2012/0075721 A1 | 3/2012 | Konishi et al. |

(Continued)

FOREIGN PATENT DOCUMENTS

| | | |
|---|---|---|
| JP | 2010-197665 | 9/2010 |
| JP | 2010-224521 | 10/2010 |

(Continued)

*Primary Examiner* — Jack Dinh
(74) *Attorney, Agent, or Firm* — Cozen O'Connor

(57) ABSTRACT

An imaging optical system, an imaging device, and a digital apparatus of the invention are provided with an optical system constituted of five lens elements having positive, negative, positive, positive, and negative refractive powers, or positive, negative, negative, positive, and negative refractive powers; and satisfy the conditional expressions:

$1 < f123/f < 1.25$ $0.1 < d6/f < 0.15$ $0.30 < f4/f < 0.72$ where
 f: a focal length of the entirety of the imaging optical system,
 f123: a combined focal length of the first lens element 11, the second lens element 12, and the third lens element 13,
 d6: a distance on the optical axis between the third lens element 13 and the fourth lens element 14, and
 f4: a focal length of the fourth lens element 14.

19 Claims, 26 Drawing Sheets

(56) References Cited

U.S. PATENT DOCUMENTS

| | | |
|---|---|---|
| 2012/0140104 A1 | 6/2012 | Ozaki |
| 2012/0224091 A1 | 9/2012 | Ohtsu |
| 2012/0293682 A1 | 11/2012 | Ohtsu |
| 2013/0088635 A1 | 4/2013 | Sano |
| 2013/0113976 A1 | 5/2013 | Shinohara |
| 2013/0135754 A1 | 5/2013 | Ise et al. |
| 2013/0135755 A1 | 5/2013 | Ise et al. |
| 2013/0135756 A1 | 5/2013 | Ise et al. |
| 2013/0222673 A1 | 8/2013 | Ohtsu |
| 2013/0229567 A1 | 9/2013 | Sano |

FOREIGN PATENT DOCUMENTS

| | | |
|---|---|---|
| JP | 2010-237407 | 10/2010 |
| JP | 2010-262270 | 11/2010 |
| JP | 2012-8164 | 1/2012 |
| KR | 10-2009-0100814 | 9/2009 |
| KR | 10-2011-0057625 | 6/2011 |
| WO | WO 2010/143459 | 12/2010 |
| WO | WO 2011/004467 | 1/2011 |
| WO | WO 2011/021271 | 2/2011 |

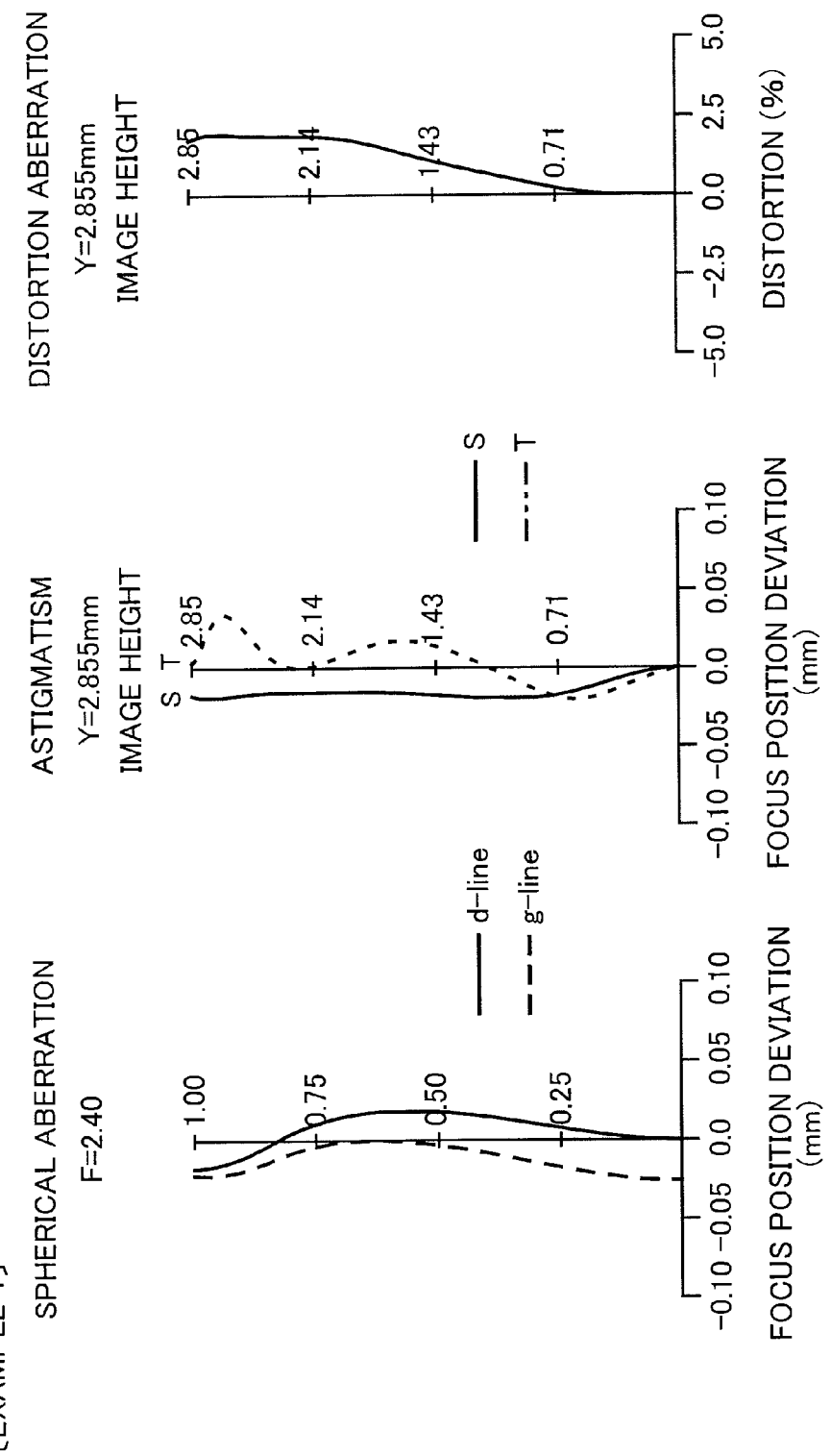

[EXAMPLE 1]

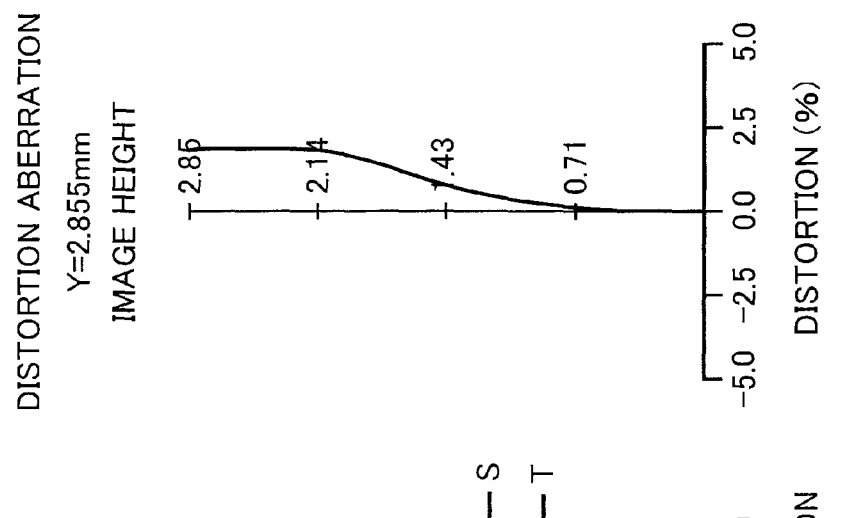
FIG. 17A  FIG. 17B  FIG. 17C
[EXAMPLE 2]
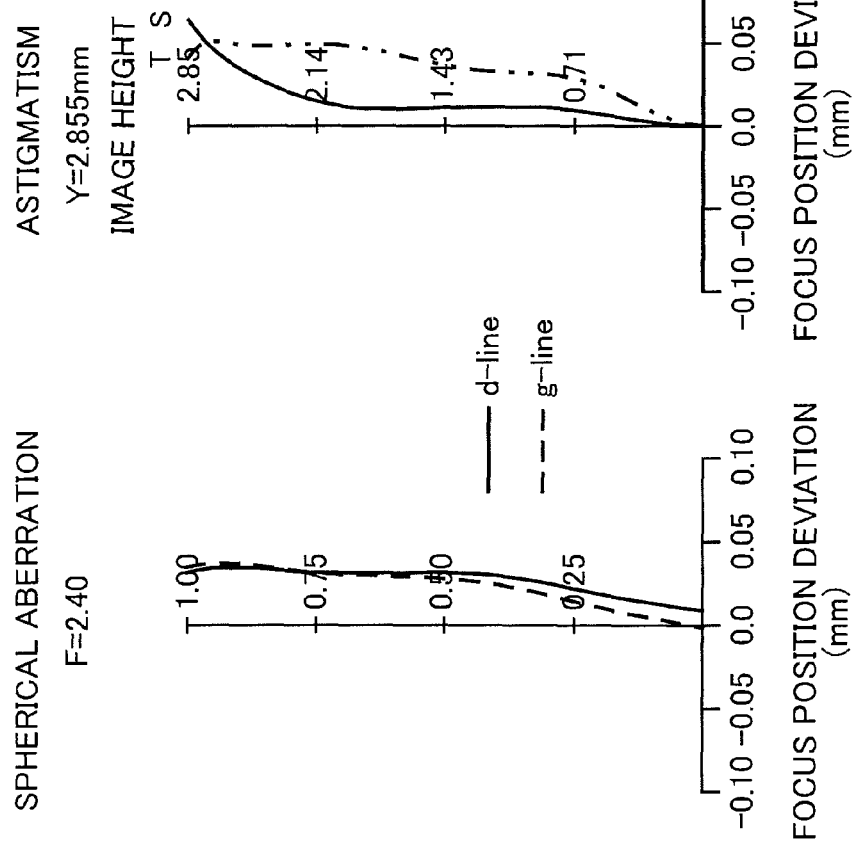

[EXAMPLE 2]

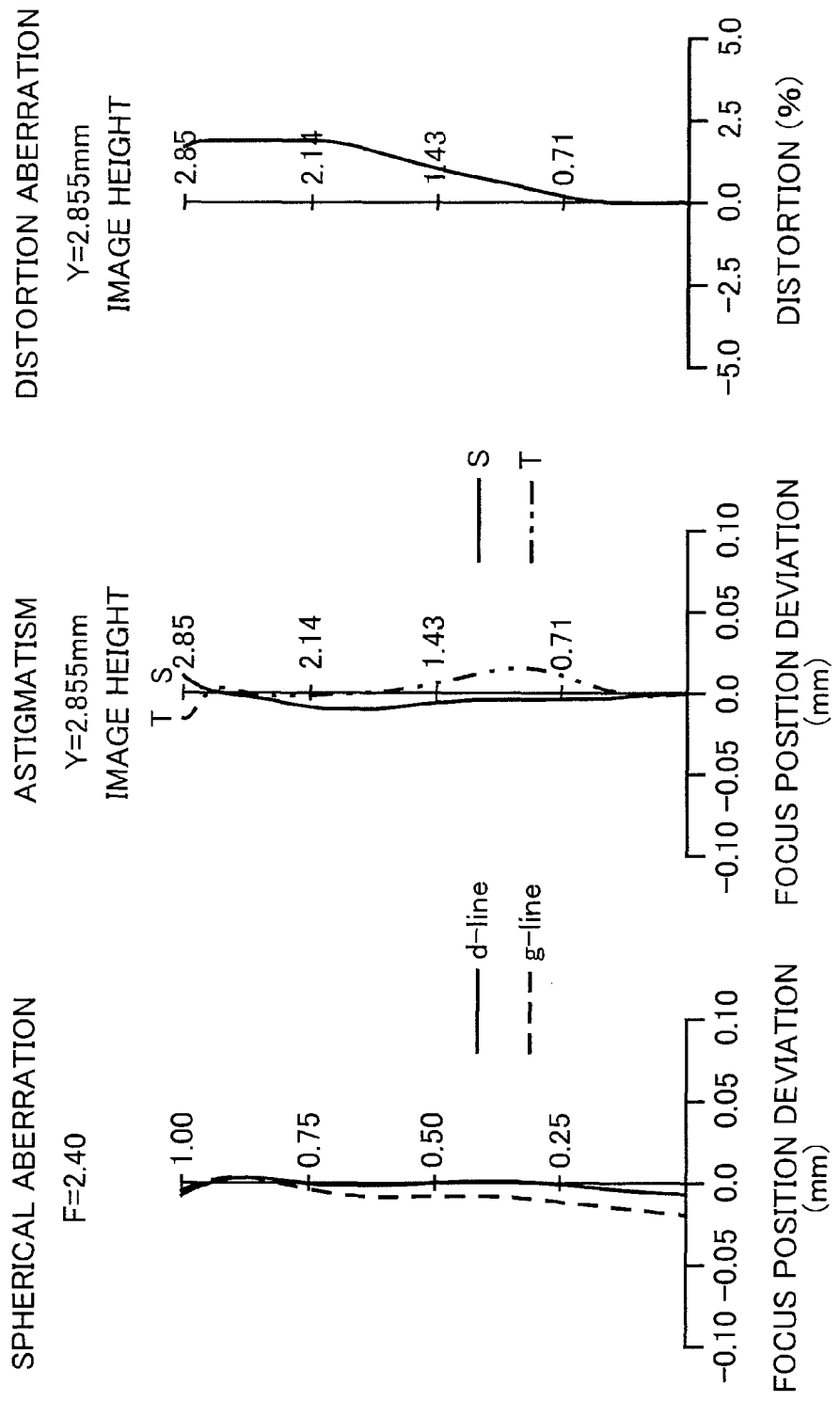

[EXAMPLE 3]

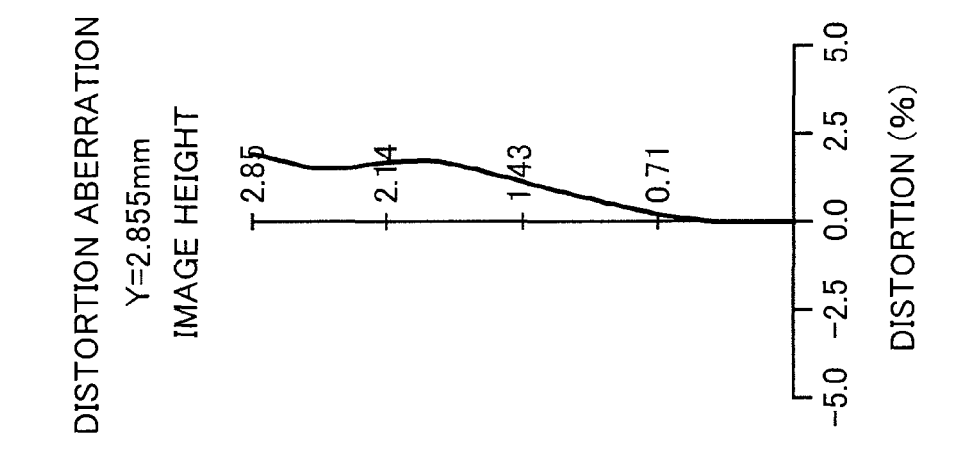
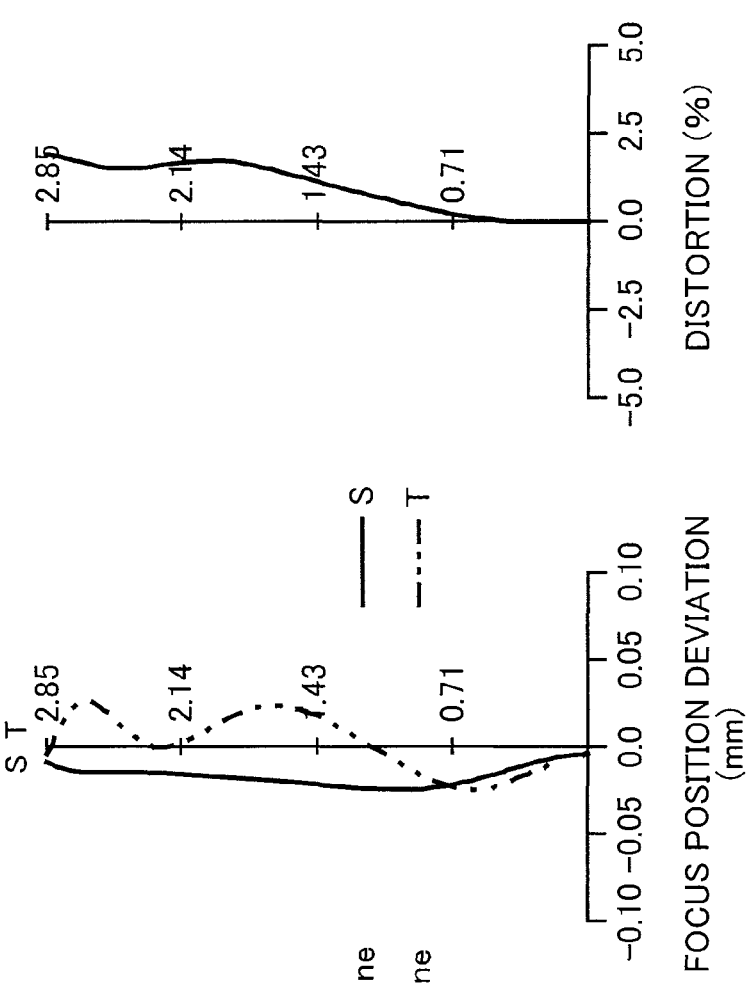
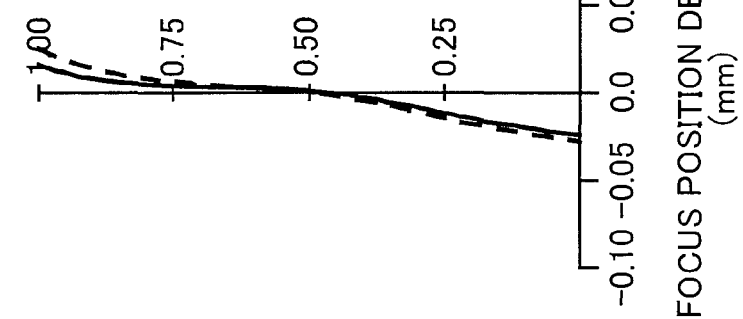

[EXAMPLE 4]

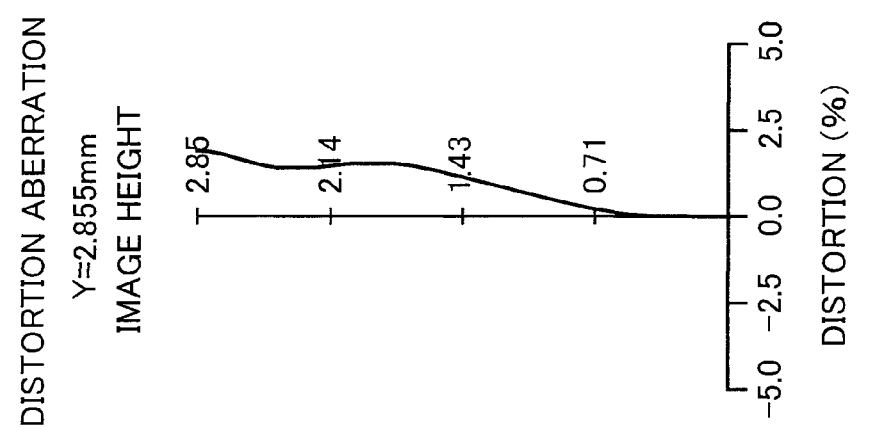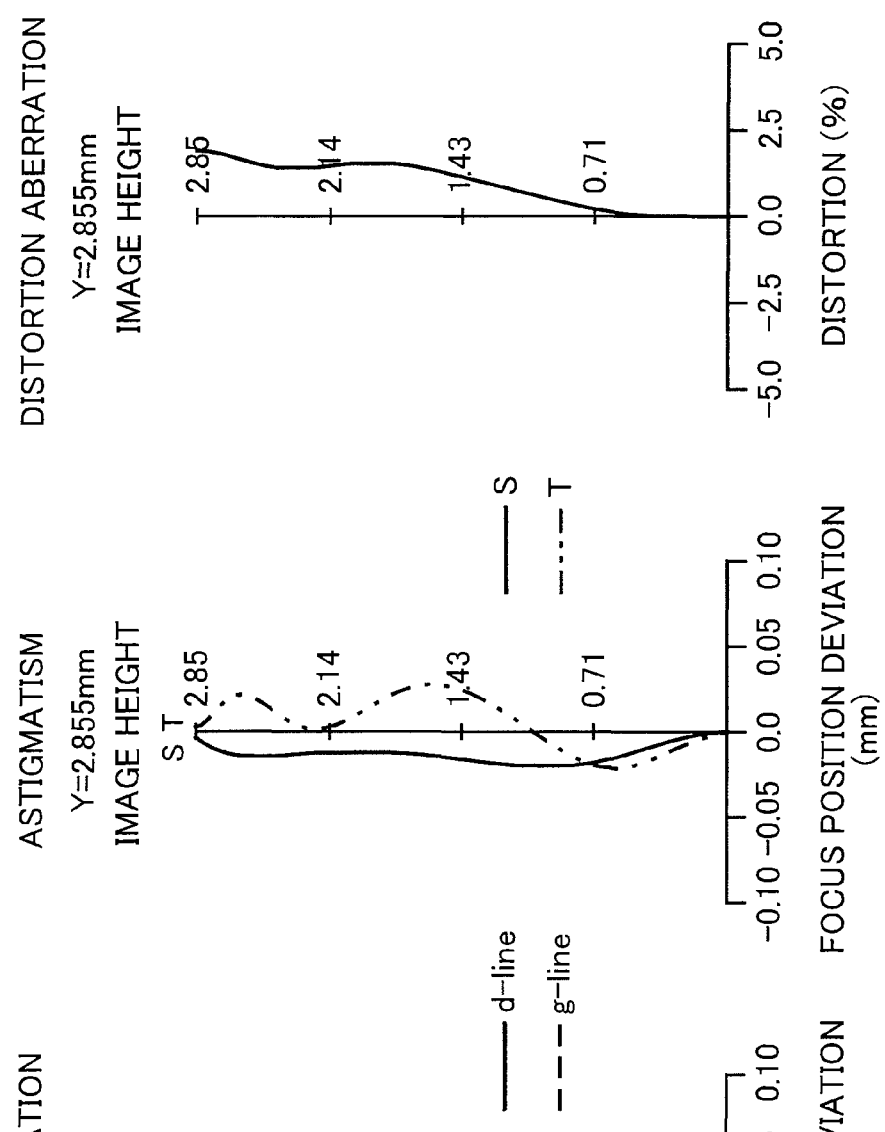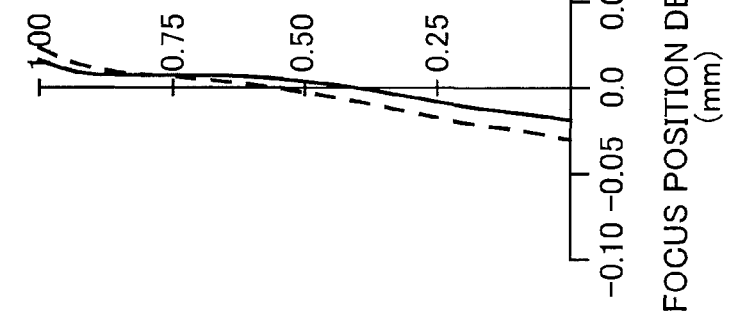

[EXAMPLE 5]

[EXAMPLE 6]

FIG. 25A  SPHERICAL ABERRATION F=2.40

FIG. 25B  ASTIGMATISM Y=2.855mm IMAGE HEIGHT

FIG. 25C  DISTORTION ABERRATION Y=2.855mm IMAGE HEIGHT

[EXAMPLE 6]

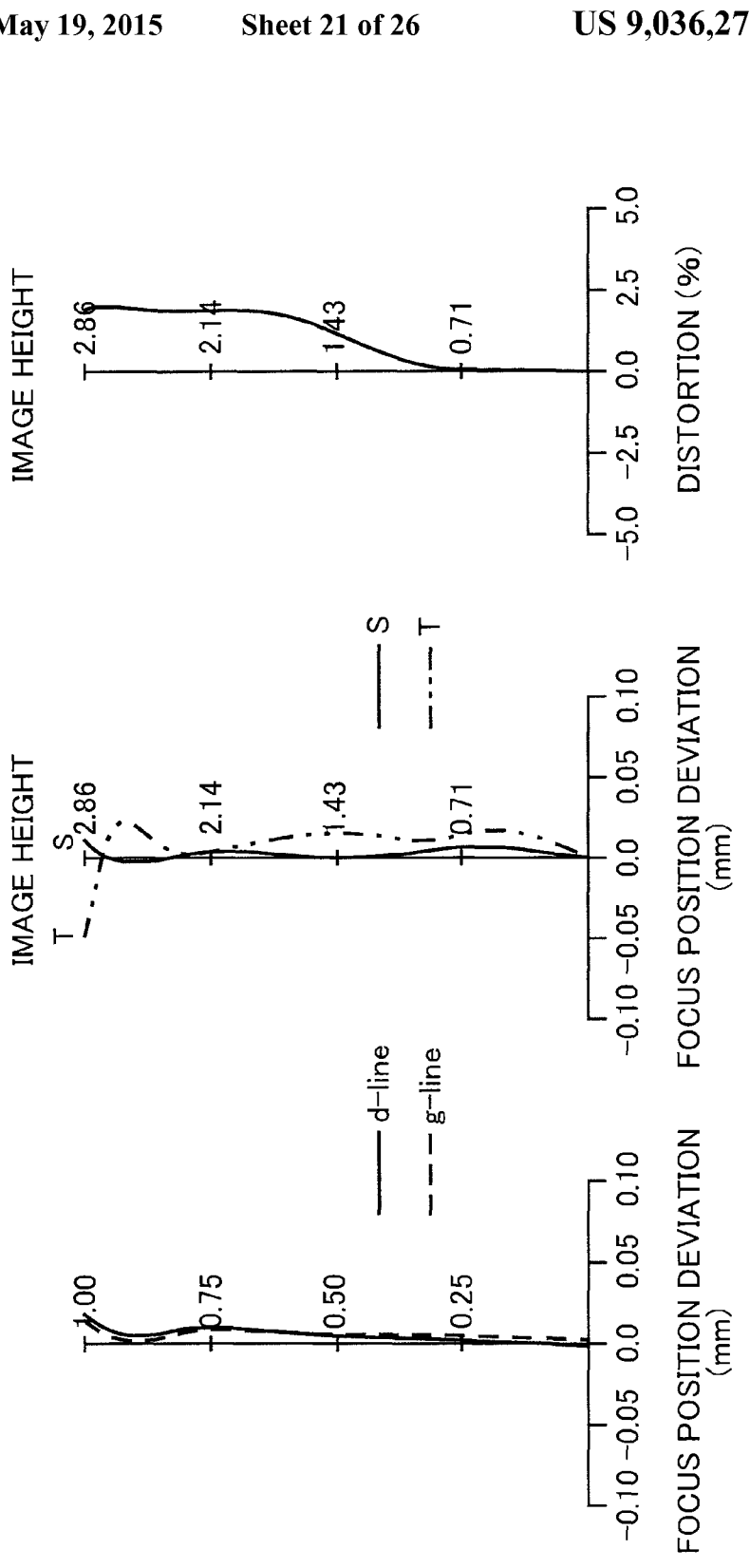

[EXAMPLE 7]

— d-line
--- g-line

FIG. 29A

[EXAMPLE 8]

SPHERICAL ABERRATION
F=2.40

— d-line
--- g-line

FOCUS POSITION DEVIATION (mm)

FIG. 29B

ASTIGMATISM
Y=3.248mm
IMAGE HEIGHT

—— S
—··— T

FOCUS POSITION DEVIATION (mm)

FIG. 29C

DISTORTION ABERRATION
Y=3.248mm
IMAGE HEIGHT

DISTORTION (%)

[EXAMPLE 8]

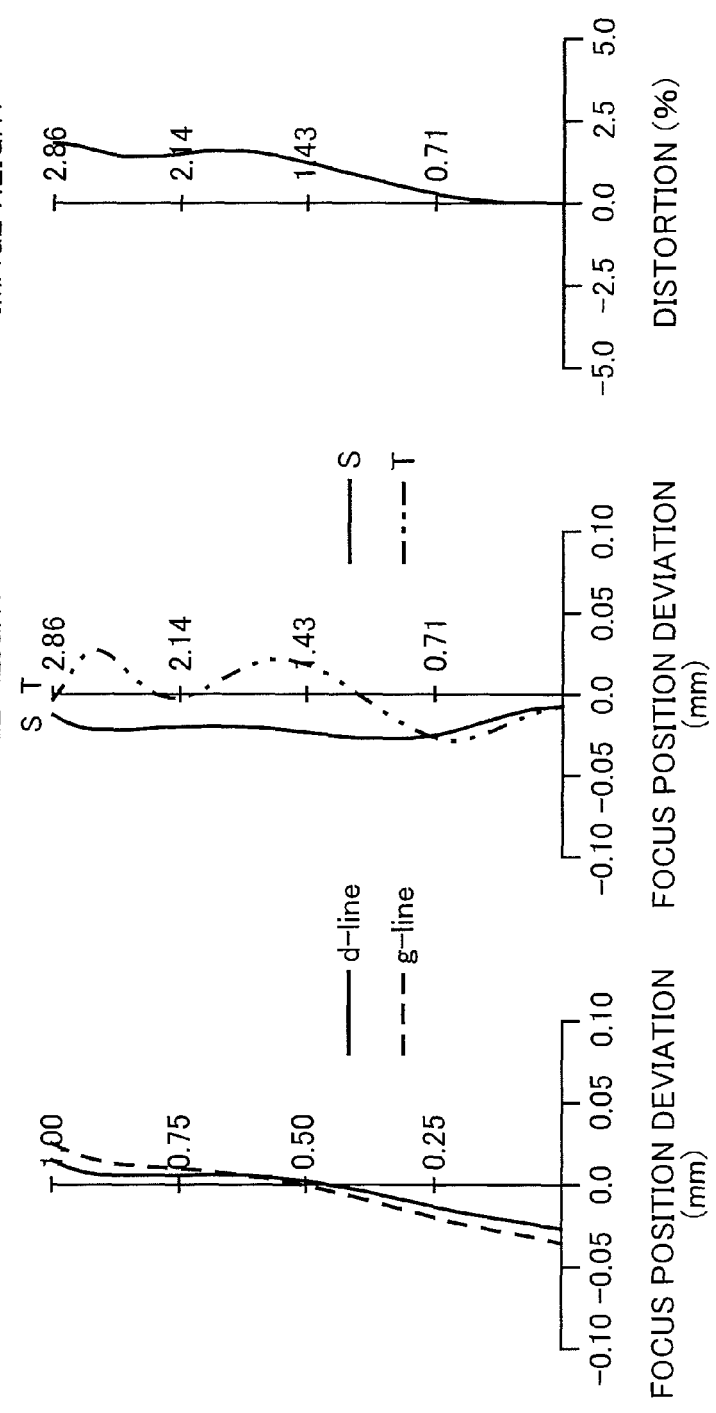

[EXAMPLE 9]

IMAGE OPTICAL SYSTEM, IMAGING DEVICE, AND DIGITAL APPARATUS

RELATED APPLICATIONS

This application is a U.S. National Phase Application under 35 USC 371 of International Application PCT/JP2012/003485 filed May 29, 2012.

This application claims the priority of Japanese application No. 2011-140638 filed Jun. 24, 2011, the entire content of which is hereby incorporated by reference.

TECHNICAL FIELD

The present invention relates to an imaging optical system, and more particularly to an imaging optical system suitably applied to a solid-state imaging element such as a CCD image sensor or a CMOS image sensor. The present invention further relates to an imaging device incorporated with the imaging optical system, and a digital apparatus loaded with the imaging device.

BACKGROUND ART

In recent years, as high performance and miniaturization of an imaging element i.e. a solid-state imaging element such as a CCD (Charged Coupled Device) image sensor or a CMOS (Complementary Metal Oxide Semiconductor) image sensor have developed, digital apparatuses such as mobile phones or personal digital assistants incorporated with an imaging device using such an imaging element have been widely spread. There is also an increasing demand for miniaturization and high performance of an imaging optical system (imaging lens) for forming an optical image of an object on a light receiving surface of the solid-state imaging element to be loaded in such an imaging device. In particular, in recent years, as the technology of increasing the pixel density in a solid-state imaging element has progressed, there is an increasing demand for high resolution in an imaging optical system. On the other hand, miniaturization of an imaging optical system has also been required as having been required in the conventional art. As an imaging optical system to be used for the above purposes, an optical system incorporated with five lens elements has been proposed, because the optical system incorporated with five lens elements provides high performance, as compared with an optical system incorporated with three lens elements or four lens elements.

Examples of the imaging optical system are disclosed in patent literature 1 and patent literature 2. The imaging lens disclosed in patent literature 1 is an imaging lens for a solid-state imaging element, and is provided with, in the order from the object side, a first lens element having a positive refractive power and convex toward the object side on the optical axis, a second lens element having a negative refractive power and concave toward the image side on the optical axis, a third lens element having a meniscus shape and convex toward the object side on the optical axis, a fourth lens element having a meniscus shape, having a positive refractive power and convex toward the image side on the optical axis, and a fifth lens element having a meniscus shape, having a negative refractive power, and concave toward the image side on the optical axis.

Further, the imaging lens disclosed in patent literature 2 is provided with, in the order from the object side, a first lens element having a positive refractive power, a second lens element having a negative refractive power, a third lens element having a positive refractive power, a fourth lens element having a positive refractive power, and a fifth lens element having a negative refractive power.

In an imaging optical system, various proposals for miniaturization have been provided, as exemplified by the imaging lenses disclosed in patent literature 1 and patent literature 2. However, there is further room for improvement on miniaturization (ultra-miniaturization). Miniaturization (ultra-miniaturization) in the specification means satisfying a requirement: L/2Y<0.8, which will be described later.

In view of the above point, for instance, patent literature 1 may fail to optimize the refractive powers of the first to third lens elements. Further, patent literature 2 may fail to optimize the refractive power of the fourth lens element. Thus, the imaging lenses disclosed in patent literature 1 and patent literature 2 may not have achieved sufficient miniaturization (ultra-miniaturization).

CITATION LIST

Patent Literature

Patent literature 1: JP 2010-237407A
Patent literature 2: US 2011/013069A

SUMMARY OF INVENTION

In view of the above, an object of the invention is to provide an imaging optical system provided with five lens elements that enables to correct various aberrations in a satisfactory manner, while achieving miniaturization.

An imaging optical system, an imaging device, and a digital apparatus according to the invention are provided with an optical system constituted of five lens elements having positive, negative, positive, positive, and negative refractive powers, or positive, negative, negative, positive, and negative refractive powers; and satisfy the following conditional expressions:

$$1 < f123/f < 1.25$$

$$0.1 < d6/f < 0.15$$

$$0.30 < f4/f < 0.72$$

where
f: a focal length of the entirety of the imaging optical system,
f123: a combined focal length of the first lens element, the second lens element, and the third lens element,
d6: a distance on the optical axis between the third lens element and the fourth lens element, and
f4: a focal length of the fourth lens element.

Accordingly, the imaging optical system, the imaging device, and the digital apparatus of the invention are advantageous in correcting various aberrations in a satisfactory manner, while achieving ultra-miniaturization, with use of the five lens elements.

These and other objects, features and advantages of the present invention will become more apparent upon reading the following detailed description along with the accompanying drawings.

BRIEF DESCRIPTION OF DRAWINGS

FIGS. 15A, 15B, and 15C are longitudinal aberration diagrams of the imaging optical system as Example 1;

FIGS. 17A, 17B, and 17C are longitudinal aberration diagrams of the imaging optical system as Example 2;

FIGS. 19A, 19B, and 19C are longitudinal aberration diagrams of the imaging optical system as Example 3;

FIGS. 21A, 21B, and 21C are longitudinal aberration diagrams of the imaging optical system as Example 4;

FIGS. 23A, 23B, and 23C are longitudinal aberration diagrams of the imaging optical system as Example 5;

FIGS. 25A, 25B, and 25C are longitudinal aberration diagrams of the imaging optical system as Example 6;

FIGS. 27A, 27B, and 27C are longitudinal aberration diagrams of the imaging optical system as Example 7;

FIGS. 29A, 29B, and 29C are longitudinal aberration diagrams of the imaging optical system as Example 8;

FIGS. 31A, 31B, and 31C are longitudinal aberration diagrams of the imaging optical system as Example 9.

DESCRIPTION OF EMBODIMENTS

Figure 1:
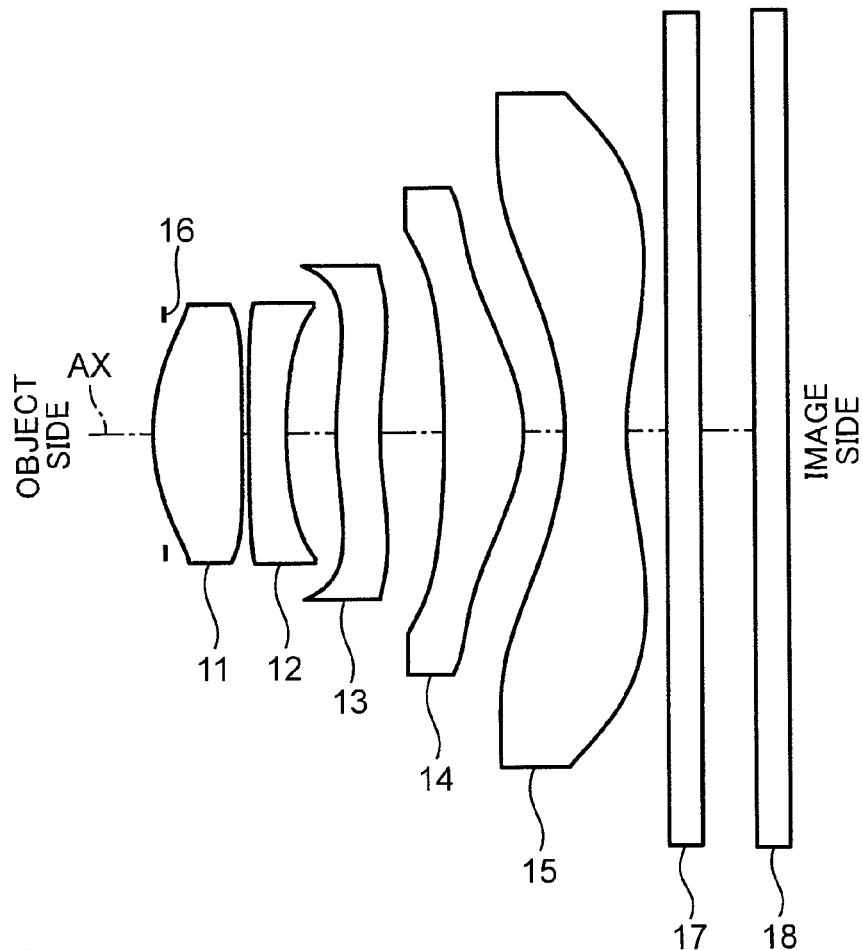
FIG. 1 is a lens sectional view schematically showing a configuration of an imaging optical system embodying the invention for describing the configuration.

In the following, an embodiment of the invention is described referring to the drawings. Constructions identified by the same reference numerals in the drawings are the same constructions and are not repeatedly described unless necessary. Further, the number of lenses in a cemented lens is represented by the number of lens elements composing the cemented lens.

<Description of Terms>

The terms used in the following description are defined as follows in this specification.

(a) A refractive index is the one for a wavelength (587.56 nm) of d-line.

(b) An Abbe number is an Abbe number νd obtained by the following definitional equation:

$$\nu d = (nd-1)/(nF-nC)$$

where nd: a refractive index for d-line, nF: a refractive index for F-line (wavelength: 486.13 nm), nC: a refractive index for C-line (wavelength: 656.28 nm), and νd: an Abbe number.

(c) Expressions such as "concave", "convex" and "meniscus" used to describe lens elements indicate the lens shapes near an optical axis (near the center of a lens element).

(d) A refractive power (an optical power, an inverse of a focal length) of each of the lens elements composing a cemented lens is a power in the case where there is air at the opposite sides of lens surfaces of each lens element.

(e) Since a resin material used for a hybrid aspherical lens has only an additional function of a glass material for a substrate, the hybrid aspherical lens is not handled as a single optical member, but handled similar to the case where the substrate composed of the glass material has an aspherical surface, and is considered to be one lens element. A lens refractive index is also considered to be a refractive index of a glass material forming a substrate. A hybrid aspherical lens is a lens having an aspherical surface by applying a thin layer of a resin material on a glass material forming a substrate.

(f) Ultra-miniaturization in the specification means satisfying a requirement: L/2Y<0.8, where L denotes a distance on the optical axis from a lens surface of a lens element closest to the object side of the entirety of the imaging optical system to an image-side focal point, and 2Y denotes a diagonal length of an imaging surface (e.g. a diagonal length of a rectangular effective pixel region of the solid-state imaging element); preferably, satisfying a requirement: L/2Y<0.78, and more preferably satisfying a requirement: L/2Y<0.76. The image-side focal point means an image point, in the case where a parallel light ray parallel to the optical axis is incident on the imaging optical system. Further, in the case where a parallel plate member such as an optical low-pass filter, an infrared cut filter, or a seal glass for a solid-state imaging element package is disposed between a surface of a lens element closest to the image side of the imaging optical system, and the image-side focal point, the aforementioned expression is calculated, assuming that the parallel plate member is air.

<Description on Imaging Optical System as Embodiment>

Figure 2:
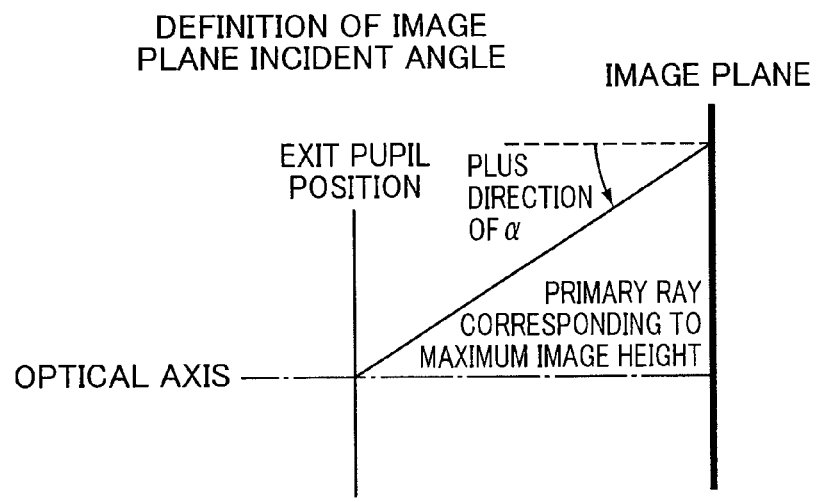
FIG. 2 is a schematic diagram showing the definition of an incident angle of a principal ray on an image plane.

FIG. 1 is a lens sectional view schematically showing a configuration of an imaging optical system embodying the invention for describing the imaging optical system. FIG. 2 is a schematic diagram showing the definition of an incident angle of a principal ray on an image plane. In the following, as shown in FIG. 2, the incident angle of a primary ray on an image plane is the angle α (unit: degree) of a principal ray incident at a maximum angle of view among the incident light rays onto an imaging surface with respect to normal to the image plane, and the image plane incident angle α is defined based on the premise that the principal ray angle is in the plus direction in the case where the exit pupil position is located on the object side than the image plane.

Referring to FIG. 1, the imaging optical system 1 is configured to form an optical image of an object (subject) on a light receiving surface of an imaging element 18 for converting the optical image into an electrical signal, and is an optical system constituted of five lens elements i.e. a first lens element 11, a second lens element 12, a third lens element 13, a fourth lens element 14, and a fifth lens element 15 in the order from the object side to the image side. The imaging element 18 is disposed at such a position that the light receiving surface thereof substantially coincides with the image plane of the imaging optical system 1. In other words, the image plane of the imaging optical system 1 corresponds to the imaging surface of the imaging element 18. The imaging optical system 1 exemplarily illustrated in FIG. 1 has the same construction as an imaging optical system 1A (see FIG. 5) as Example 1 to be described later.

In the imaging optical system 1, all the first to fifth lens elements 11 to 15 are integrally movable in the optical axis direction for focusing.

Further, the first lens element 11 has a positive refractive power, the second lens element 12 has a negative refractive power, with a concave surface toward the image side, the third lens element 13 has a positive refractive power, the fourth lens element 14 has a positive refractive power, with a convex surface toward the image side, and the fifth lens element 15 has a negative refractive power. More specifically, in the example shown in FIG. 1, the first lens element 11 is a biconvex positive lens element having a convex shape on both surfaces thereof, the second lens element 12 is a negative meniscus lens element having a meniscus shape, with a concave surface toward the image side, the third lens element 13 is a positive meniscus lens element having a meniscus shape, with a convex surface toward the object side, the fourth lens element 14 is a positive meniscus lens element having a meniscus shape, with a convex surface toward the image side, and the fifth lens element 15 is a biconcave negative lens element having a concave surface toward the image side. In the example shown in FIG. 1, the third lens element 13 has a positive refractive power, but may have a negative refractive power. In other words, the third lens element 13 has a positive refractive power or a negative refractive power. Both surfaces of each of the first to fifth lens elements 11 to 15 have an aspherical shape.

The first to fifth lens elements 11 to 15 may be glass molded lens elements, or may be lens elements made of a resin material such as plastic. In particular, in the case where the imaging optical system is loaded in a mobile terminal device, it is preferable to use a resin lens element in view of reducing the weight and the cost of the device and in view of processability. In the example shown in FIG. 1, the first to fifth lens elements 11 to 15 are resin lens elements.

Further, the imaging optical system 1 satisfies the following conditional expressions (1) to (3).

$$1 < f123/f < 1.25 \quad (1)$$

$$0.1 < d6/f < 0.15 \quad (2)$$

$$0.30 < f4/f < 0.72 \quad (3)$$

where f denotes a focal length of the entirety of the imaging optical system 1, f123 denotes a combined focal length of the first lens element 11, the second lens element 12, and the third lens element 13, and f4 denotes a focal length of the fourth lens element 14.

In the imaging optical system 1, an optical diaphragm 16 such as an aperture stop is disposed on the object side of the first lens element 11.

Further, a filter 17 and the imaging element 18 are disposed on the image side of the imaging optical system 1, in other words, on the image side of the fifth lens element 15. The filter 17 is an optical element in the form of a parallel plate, and is a schematic example of various optical filters, or a cover glass (seal glass) for the imaging element 18. It is possible to dispose an optical filter such as an optical low-pass filter or an infrared cut filter, as necessary, depending on the purpose of use or the configuration of an imaging element or a camera. The imaging element 18 is an element configured to photoelectrically convert an optical image of an object formed by the imaging optical system 1 into image signals of respective color components of R (red), G (green) and B (blue) in accordance with the light amount of the optical image, and to output the image signals to a specified image processing circuit (not shown). Thus, the optical image of the object on the object side is guided to the light receiving surface of the imaging element 18 at a suitable magnification ratio along the optical axis AX by the imaging optical system 1, whereby the optical image of the object is captured by the imaging element 18.

The imaging optical system 1 having the above configuration is constituted of five lens elements i.e. the first to fifth lens elements 11 to 15. Providing the first to fifth lens elements 11 to 15 with the aforementioned optical characteristics, and disposing the first to fifth lens elements 11 to 15 in the order from the object side to the image side as described above makes it possible to correct various aberrations in a satisfactory manner, while achieving ultra-miniaturization.

More specifically, the imaging optical system 1 has a telephoto lens system configured such that a positive lens group is followed by a negative lens element, in which lens elements having positive, negative, positive, positive, and negative refractive powers, or positive, negative, negative, positive, and negative refractive powers are disposed in this order from the object side. The above lens configuration is advantageous in shortening the total length of the imaging optical system (imaging lens) 1.

Providing two or more negative lens elements out of the first to fifth lens elements 11 to 15, namely, setting the second lens element 12 and the fifth lens element 15 as negative lens elements in the example shown in FIG. 1, makes it possible to increase the number of lens surfaces capable of diverging light, and makes it easy to correct a Petzval sum. Accordingly, the imaging optical system 1 makes it possible to secure good image forming performance up to a peripheral portion of a screen.

Further, the imaging optical system 1 having the above configuration is provided with the fourth lens element 14, which is a lens element having a positive refractive power and having a convex surface toward the image side. This makes it possible to guide an off-axis light ray emanating from the second lens element 12 at a large angle to the fifth lens element 15, while suppressing an increase in the refraction angle. The above configuration is advantageous in suppressing off-axis aberration in a satisfactory manner.

The imaging optical system 1 having the above configuration satisfies the aforementioned conditional expressions (1) to (3). Specifically, the conditional expression (1) is a conditional expression that appropriately sets the combined focal length f123 of the first lens element 11, the second lens element 11, and the third lens element 13 for shortening the total length of the imaging optical system 1 and for appropriately correcting aberrations. The imaging optical system 1 having the above configuration makes it possible to suppress an excessive increase in chromatic aberration by controlling the value of the conditional expression (1) so as not to fall below the lower limit of the conditional expression (1). On the other hand, the imaging optical system 1 having the above configuration makes it possible to shorten the total length of the imaging optical system 1 by controlling the value of the conditional expression (1) so as not to exceed the upper limit of the conditional expression (1). Further, the conditional expression (2) is a conditional expression that appropriately sets the distance d6 between the third lens element 13 and the fourth lens element 14 for shortening the total length of the imaging optical system 1 and for appropriately correcting aberrations. The imaging optical system 1 having the above configuration makes it possible to effectively separate an on-axis light ray and an off-axis light ray outputted from the third lens element 13 from each other, and makes it possible to correct off-axis aberration by the fourth lens element 14 in a satisfactory manner by controlling the value of the conditional expression (2) so as not to fall below the lower limit of the conditional expression (2). On the other hand, the imaging optical system 1 having the above configuration makes it possible to shorten the total length of the imaging optical system 1 by controlling the value of the conditional expression (2) so as not to exceed the upper limit of the conditional expression (2). Further, the conditional expression (3) is a conditional expression that appropriately sets the focal length f4 of the fourth lens element 14 for appropriately correcting aberration of an off-axis light flux. The imaging optical system 1 having the above configuration makes it possible to suppress coma aberration generated on the fourth lens element 14, while suppressing an excessive increase in the optical power of the fourth lens element 14 by controlling the value of the conditional expression (3) so as not to fall below the lower limit of the conditional expression (3). On the other hand, the imaging optical system 1 having the above configuration makes it possible to shorten the total length of the imaging optical system 1 by controlling the value of the conditional expression (3) so as not to exceed the upper limit of the conditional expression (3).

In view of the above points, the conditional expression (1) may preferably be the following conditional expression (1A), and more preferably be the following conditional expression (1B).

$1 < f123/f < 1.2$ (1A)

$1 < f123/f < 1.15$ (1B)

Further, in view of the above points, the conditional expression (2) may preferably be the following conditional expression (2A), and more preferably be the following conditional expression (2B).

$0.11 < d6/f < 0.15$ (2A)

$0.12 < d6/f < 0.15$ (2B)

Further, in view of the above points, the conditional expression (3) may preferably be the following conditional expression (3A), and more preferably be the following conditional expression (3B).

$0.4 < f4/f < 0.67$ (3A)

$0.45 < f4/f < 0.6$ (3B)

Further, in view of the above points, combination of the above conditional expressions may be furthermore preferable.

Further, in the imaging optical system 1, the third lens element 13 has a positive refractive power in a paraxial region thereof. In the imaging optical system 1 having the above configuration, the lens system has a triplet configuration, in which the first to third lens elements 11 to 13 respectively have a positive refractive power, a negative refractive power, and a positive refractive power in this order. The imaging optical system 1 having the above configuration is advantageous is correcting various aberrations in a satisfactory manner.

Further, in the imaging optical system 1, the third lens element 13 has a convex surface toward the object side in a paraxial region thereof. The imaging optical system 1 having the above configuration makes it possible to set the combined principal point position of the first lens element 11, the second lens element 12, and the third lens element 13 at a position closer to the object side. This is advantageous in shortening the total length of the imaging optical system 1.

Further, in the imaging optical system 1, the fifth lens element 15 has a concave surface concave toward the object side in a paraxial region thereof. The imaging optical system 1 having the above configuration makes it possible to guide an off-axis light ray emanating from the second lens element 12 at a large angle to the fifth lens element 15, while suppressing an increase in the refraction angle. The above configuration is advantageous in suppressing off-axis aberration in a satisfactory manner.

Further, the imaging optical system 1 is provided with an optical diaphragm 16 such as an aperture stop at a position closest to the object side. The imaging optical system 1 having the above configuration makes it possible to implement desirable telecentric characteristics by disposing the optical diaphragm 16 such as an aperture stop on the object side of the first lens element 11.

Further, in the imaging optical system 1, as described above, all the first to fifth lens elements 11 to 15 are resin lens elements made of a resin material. In recent years, there is an increasing demand for further miniaturization of the entirety of a solid-state imaging device. There has been developed a solid-state imaging device having a small pixel pitch and accordingly having a small imaging surface, with use of a solid-state imaging element having the same pixel number as a conventional imaging element. In an imaging optical system for use in such a solid-state imaging element having a small imaging surface, it is necessary to relatively shorten the focal length of the entire optical system. This results in a considerable reduction of the curvature radius or the outer diameter of each lens element. In the imaging optical system 1, all the lens elements are constituted of resin lens elements manufactured by injection molding. Accordingly, it is possible to mass-produce the imaging optical system 1 at a low cost, regardless of use of the lens elements having a small curvature radius or outer diameter, as compared with an optical system incorporated with glass lens elements to be manufactured by a polishing process, which is cumbersome. Further, a resin lens element is advantageous in a point that the pressing temperature can be lowered. Accordingly, it is possible to suppress wear of a molding die. As a result, the number of times of replacing the molding die or the number of times of maintenance can be reduced. This is advantageous in suppressing the cost.

Further, the fourth lens element 14 of the imaging optical system 1 satisfies the following conditional expression (4).

$0.8 < (R41+R42)/(R41-R42) < 1.5$ (4)

where R41 denotes a curvature radius of an object-side surface of the fourth lens element 14, and R42 denotes a curvature radius of an image-side surface of the fourth lens element 14.

The conditional expression (4) is a conditional expression that appropriately sets the shaping factor of the fourth lens element 14 for appropriately correcting aberrations. The imaging optical system 1 having the above configuration makes it possible to correct spherical aberration by controlling the value of the conditional expression (4) so as not to exceed the upper limit of the conditional expression (4). On the other hand, the imaging optical system 1 having the above configuration makes it possible to guide an off-axis light ray emanating from the second lens element 12 at a large angle to the fifth lens element 15 while suppressing an increase in the refraction angle at each of the lens elements by controlling the value of the conditional expression (4) so as not to fall below the lower limit of the conditional expression (4). This is advantageous in suppressing off-axis aberration in a satisfactory manner.

In view of the above points, the conditional expression (4) may preferably be the following conditional expression (4A).

$$0.8<(R41+R42)/(R41-R42)<1.2 \quad (4A)$$

Further, the imaging optical system 1 satisfies the following conditional expression (5).

$$0.6<f1/f<0.8 \quad (5)$$

where f1 denotes a focal length of the first lens element.

The conditional expression (5) is a conditional expression that appropriately sets the focal length f1 of the first lens element 11 for shortening the total length of the imaging optical system 1 and for appropriately correcting aberrations. The imaging optical system 1 having the above configuration makes it possible to appropriately maintain the refractive power of the first lens element 11, and makes it possible to set the combined principal point position of the first lens element 11, the second lens element 12, the third lens element 13, and the fourth lens element 14 at a position closer to the object side by controlling the value of the conditional expression (5) so as not to exceed the upper limit of the conditional expression (5). This is advantageous in shortening the total length of the imaging optical system 1. On the other hand, the imaging optical system 1 having the above configuration makes it possible to suppress an excessive increase in the refractive power of the first lens element 11, and makes it possible to suppress high-order spherical aberration or coma aberration which may be generated on the first lens element 11 by controlling the value of the conditional expression (5) so as not to fall below the lower limit of the conditional expression (5).

In view of the above points, the conditional expression (5) may preferably be the following conditional expression (5A).

$$0.65<f1/f<0.75 \quad (5A)$$

Further, the third lens element 13 of the imaging optical system 1 satisfies the following conditional expressions (6) and (7).

$$2.5<f3/f5 \quad (6)$$

$$3.5 \le vd3<65 \quad (7)$$

where f3 denotes a focal length of the third lens element 13, and vd3 denotes the Abbe number of the third lens element 13.

The conditional expressions (6) and (7) are conditional expressions that appropriately set the focal length f3 of the third lens element 13 for shortening the total length of the imaging optical system 1 and for appropriately correcting aberrations. The imaging optical system 1 having the above configuration makes it possible to shorten the total length of the imaging optical system 1 by controlling the value of the conditional expression (6) to satisfy the conditional expression (6). Further, the imaging optical system 1 having the above configuration makes it possible to suppress generation of chromatic aberration by controlling the value of the conditional expression (7) so as not to fall below the lower limit of the conditional expression (7). On the other hand, the imaging optical system 1 having the above configuration makes it possible to suppress an increase in the cost resulting from use of a special material by controlling the value of the conditional expression (7) so as not to exceed the upper limit of the conditional expression (7).

Further, the third lens element 13 of the imaging optical system 1 satisfies the following conditional expressions (8) and (9)

$$5<|f3/f| \quad (8)$$

$$1.57<Nd3<1.67 \quad (9)$$

where f3 denotes a focal length of the third lens element 13, and Nd3 denotes a refractive index of the third lens element 13 with respect to d-line.

The conditional expressions (8) and (9) are conditional expressions that appropriately set the focal length f3 of the third lens element 13 for appropriately correcting aberrations. The imaging optical system 1 having the above configuration makes it possible to suppress an increase in the cost resulting from use of a special material by controlling the value of the conditional expression (8) and the value of the conditional expression (9) to satisfy the respective conditional expressions (8) and (9).

Further, the imaging optical system 1 satisfies the following conditional expression (10).

$$-0.6<f5/f<-0.3 \quad (10)$$

where f5 denotes a focal length of the fifth lens element 15.

The conditional expression (10) is a conditional expression that appropriately sets the focal length f5 of the fifth lens element 15 for shortening the total length of the imaging optical system 1 and for appropriately correcting aberrations. The imaging optical system 1 having the above configuration makes it possible to suppress an excessive increase in the refractive power of the fifth lens element 15, and makes it possible to prevent deterioration of telecentricity by controlling the value of the conditional expression (10) so as not to exceed the upper limit of the conditional expression (10). On the other hand, the imaging optical system 1 having the above configuration makes it possible to appropriately maintain the refractive power of the fifth lens element 15 by controlling the value of the conditional expression (10) so as not to fall below the lower limit of the conditional expression (10). This is advantageous in shortening the total length of the imaging optical system 1, while securing the back focal length of the imaging optical system 1.

Further, in view of the above points, the conditional expression (10) may preferably be the following conditional expression (10A), and may more preferably be the following conditional expression (10B).

$$-0.5<f5/f<-0.3 \quad (10A)$$

$$-0.4<f5/f<-0.3 \quad (10B)$$

The imaging optical system 1 having the above configurations may be preferably further provided with a light shielding plate which is disposed between the first lens element 11 and the second lens element 12 for shielding at least a part of diagonal light rays. The imaging optical system 1 having the above configuration makes it possible to prevent stray light, and makes it possible to shield upper rays by shielding at least a part of light rays diagonally incident on the imaging element 18 with use of the light shielding plate between the first lens element 11 and the second lens element 12. The above configuration is advantageous in improving coma aberration.

Figure 3:
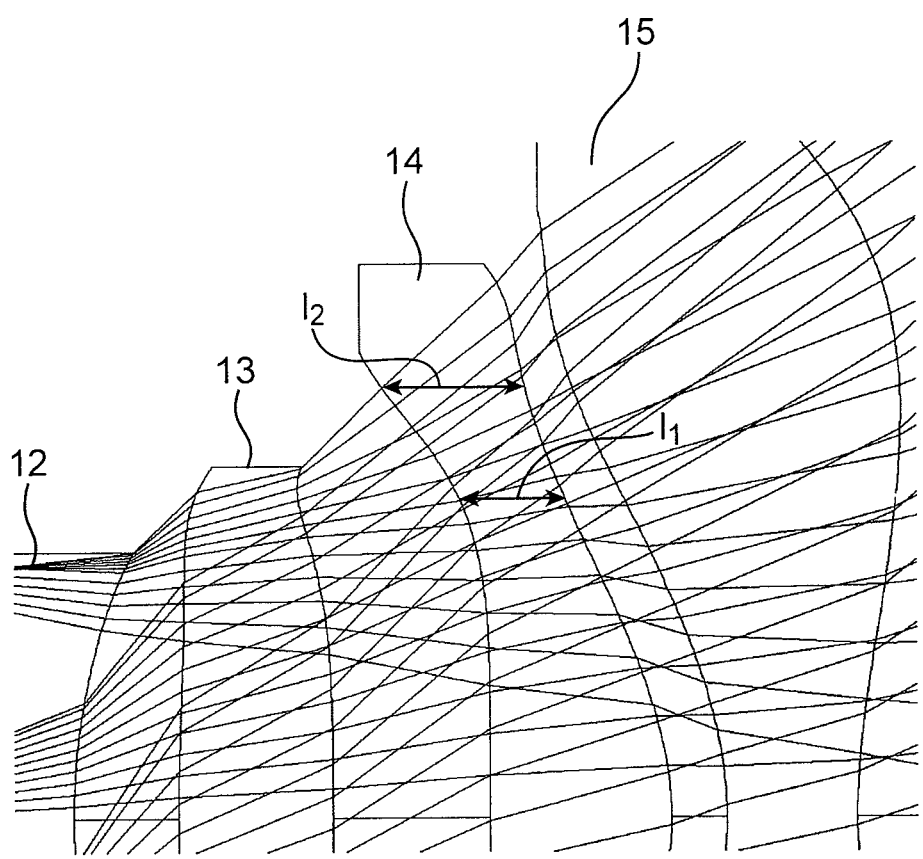
FIG. 3 is a lens sectional view schematically and enlargedly showing a peripheral part of a fourth lens element as a modification.

FIG. 3 is a lens sectional view schematically and enlargedly showing a peripheral part of a fourth lens element as a modification. Further, in the imaging optical system 1 having the above configurations, preferably, the fourth lens element 14 may have an aspherical surface at least on one of the object-side surface and the image-side surface thereof; and the thickness of the fourth lens element 14 may be changed in such a manner that, as shown in FIG. 3, the thickness decreases, as light is distanced from the optical axis toward the end of an effective region of the fourth lens element 14, and then increases. The lens thickness in the specification means a length in a direction along the optical axis direction. In FIG. 3, a thinnest portion of the fourth lens element 14 whose thickness decreases, as light is distanced from the optical axis toward the end of the effective region is indicated by $I_1$. A portion whose thickness increases, as light is further distanced from the thinnest portion $I_1$ toward the end of the effective region of the fourth lens element 14, and whose thickness is larger than the thinnest portion $I_1$, is indicated by $I_2$. The imaging optical system 1 having the above configuration provides a positive refractive power in a paraxial region of the fourth lens element 14, and provides a negative refractive power in an off-axis region of the fourth lens element 14. The above configuration is advantageous in shortening the total length of the imaging optical system 1, while correcting field curvature.

Further, in the imaging optical system 1 having the above configurations, a cam or a stepping motor may be used, or a piezoelectric actuator may be used for driving the movable first to fifth lens elements 11 to 15. In the case where a piezoelectric actuator is used, it is possible to drive the lens elements independently of each other, while suppressing an increase in volume and electric power consumption of a driving device. This is more advantageous in miniaturizing the imaging device.

Further, as described above, a resin lens element is used in the imaging optical system 1 having the above configurations. Alternatively, in the imaging optical system 1, a glass lens element having an aspherical surface may be used. In the modification, the aspherical glass lens element may be a glass molded aspherical lens element, a ground aspherical glass lens element, or a hybrid aspherical lens element (a lens element obtained by forming an aspherical resin layer on a spherical glass lens element). The glass molded aspherical lens element is preferable for mass production. The hybrid aspherical lens element has a high degree of freedom in design, because many kinds of glass materials capable of molding into a substrate are available. In particular, it is preferable to use a hybrid aspherical lens element, in view of a point that it is not easy to mold a material having a high refractive index into an aspherical lens element. Further, forming one surface of a lens element into an aspherical surface is advantageous in maximally utilizing the advantages of the hybrid aspherical lens element.

Further, in the case where a plastic lens element is used in the imaging optical system 1 having the above configurations, it is preferable to use a lens element molded by using a material, in which particles of 30 nm or smaller as a maximum diameter are dispersed in plastic (resin material).

Generally, if fine particles are mixed with a transparent resin material, light is scattered, which lowers the transmittance. Thus, it has been difficult to use such a material as an optical material. However, by setting the size of the fine particles to a value smaller than the wavelength of a transmitted light flux, light is not substantially scattered. As temperature rises, the refractive index of the resin material is lowered. Conversely, as temperature rises, the refractive index of inorganic particles is raised. Accordingly, it is possible to generally keep the refractive index unchanged with respect to a temperature change by cancelling out the refractive indexes, taking advantage of such temperature dependencies. More specifically, it is possible to obtain a resin material having a refractive index with less temperature dependence by dispersing inorganic particles having a maximum diameter of 30 nm or smaller in the resin material as a base material. For example, fine particles of niobium oxide ($Nb_2O_5$) are dispersed in acrylic resin. In the imaging optical system 1 having the above configurations, variation of the image point position at the time of temperature change in the entirety of the imaging optical system 1 can be suppressed by using a resin material containing inorganic fine particle dispersants for a lens element having a relatively large refractive power or for all the lens elements.

It is preferable to mold such a resin lens element containing inorganic fine particles as a dispersant as follows.

A refractive index change with temperature is described as follows. A refractive index change n(T) with temperature is expressed by the following formula (Fa) by differentiating a refractive index n by temperature T based on the Lorentz-Lorentz formula.

$$n(T)=((n^2+2)\times(n^2-1))/6n\times(-3\alpha+(1/[R])\times(\partial[R]/\partial T))  \quad (Fa)$$

where $\alpha$ denotes a linear expansion coefficient and [R] denotes a molecular refraction.

In the case of a resin material, contribution of the refractive index to the temperature dependence is generally smaller in the second term than in the first term of the formula Fa, and can be substantially ignored. For instance, in the case of a PMMA resin, the linear expansion coefficient $\alpha$ is $7\times10^{-5}$, and, if the linear expansion coefficient $\alpha$ is substituted into the formula (Fa), $n(T)=-12\times10^{-5}$ (/° C.), which substantially coincides with an actual measurement value.

Specifically, the refractive index change n(T) with temperature, which conventionally has been about $-12\times10^{-5}$ (/° C.), is preferably suppressed to below $8\times10^{-5}$ (1° C.) in absolute value, and more preferably suppressed to below $6\times10^{-5}$ (1° C.) in absolute value.

In view of the above, it is preferable to use a resin material containing polyolefin, a resin material containing polycarbonate, or a resin material containing polyester, as such a resin material. The refractive index change n(T) with temperature is about $-11\times10^{-5}$ (1° C.) in the resin material containing polyolefin, about $-14\times10^{-5}$ (1° C.) in the resin material containing polycarbonate, and about $-13\times10^{-5}$ (1° C.) in the resin material containing polyester.

<Description on Digital Apparatus Incorporated with Imaging Optical System>

In this section, a digital apparatus incorporated with the aforementioned imaging optical system 1 is described.

Figure 4:
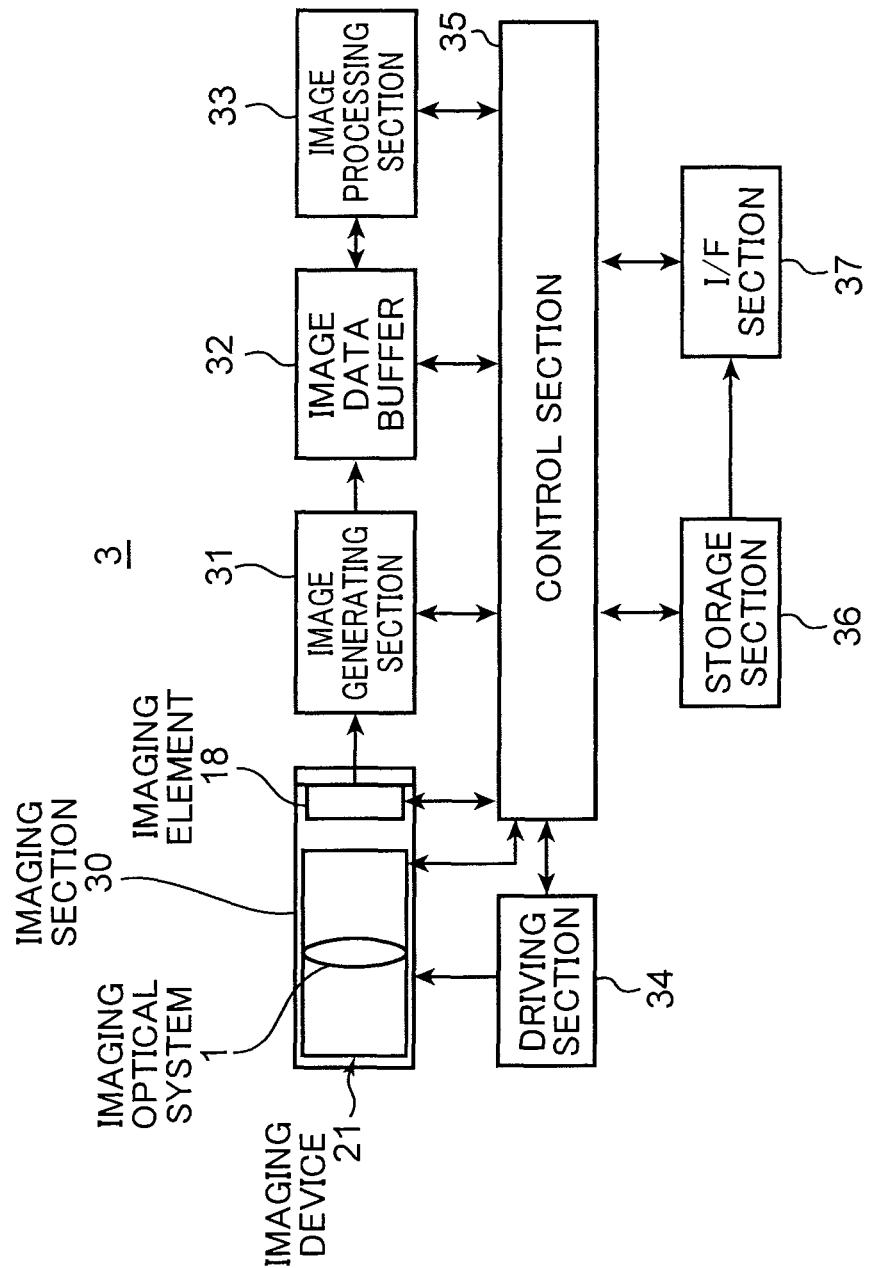
FIG. 4 is a block diagram showing a configuration of a digital apparatus embodying the invention.

FIG. 4 is a block diagram showing a configuration of a digital apparatus embodying the invention. The digital apparatus 3 is provided with, as imaging functions, an imaging section 30, an image generating section 31, an image data buffer 32, an image processing section 33, a driving section 34, a control section 35, a storage section 36, and an I/F section 37. Examples of the digital apparatus 3 are a digital still camera, a video camera, a monitor camera, a mobile terminal device such as a mobile phone and a personal digital assistant (PDA), a personal computer, and a mobile computer. Peripheral devices (e.g. a mouse, a scanner, and a printer) of these devices may be included as examples of the digital apparatus 3. In particular, the imaging optical system 1 of the embodiment is sufficiently miniaturized to be loaded in a mobile terminal device such as a mobile phone or a personal digital assistant (PDA), and is suitably loaded in the mobile terminal device.

The imaging section 30 is constituted of an imaging device 21 and the imaging element 18. The imaging device 21 is provided with the imaging optical system 1 functioning as an imaging lens, as shown in FIG. 1, and an unillustrated lens driving device which drives the lens elements for focusing in the optical axis direction so as to perform a focusing operation. Light rays from an object are formed on the light receiving surface of the imaging element 18 by the imaging optical system 1, whereby an optical image of the object is obtained.

As described above, the imaging element 18 converts an optical image of an object formed by the imaging optical system 1 into electrical signals (image signals) of respective color components of R, G and B, and outputs these electrical signals to the image generating section 31 as image signals of the respective colors of R, G and B. The imaging element 18 is controlled by the control section 35 to perform an imaging operation e.g. at least one of a still image imaging operation and a moving image imaging operation, or a readout operation of output signals from the respective pixels in the imaging element (including horizontal synchronization, vertical synchronization, transfer).

The image generating section 31 performs an amplification processing, a digital conversion processing and the like with respect to analog output signals from the imaging element 18, performs known image processings such as determination of a proper black level, gamma-correction, white balance adjustment (WB adjustment), outline correction and color unevenness correction for the entire image, and generates image data from the image signals. The image data generated by the image generating section 31 is outputted to the image data buffer 32.

The image data buffer 32 is a memory which temporarily stores image data, and is used as a work area in which the image processing section 33 performs a processing to be described later with respect to the image data. An example of the image data buffer 32 is an RAM (Random Access Memory), which is a volatile storage element.

The image processing section 33 is a circuit for performing a predetermined image processing such as resolution conversion with respect to image data from the image data buffer 32.

Further, the image processing section 33 may be so configured as to correct aberrations, which could not be corrected by the imaging optical system 1, by performing a known distortion correction processing for correcting a distortion in an optical image of an object formed on the light receiving surface of the imaging element 18, as necessary. A distortion correction is correcting an image distorted by aberrations into a natural image substantially free from distortion and having a similar shape as a scene seen by the naked eyes. In such a configuration, even if an optical image of an object introduced to the imaging element 18 by the imaging optical system 1 is distorted, it is possible to generate a natural image substantially free from distortion. Further, in a configuration for correcting a distortion by an image processing by means of information processing, only the aberrations other than the distortion have to be considered, wherefore a degree of freedom in the design of the imaging optical system 1 is increased, and an easier design becomes possible. Further, in a configuration for correcting such a distortion by an image processing by means of information processing, in particular, aberration of a lens element closer to the image plane is reduced. This makes it easy to control the exit pupil position, and to form a lens element into an intended shape.

Further, the image processing section 33 may also perform a known peripheral illuminance reduction correction processing for correcting a reduction in peripheral illuminance in an optical image of an object formed on the light receiving surface of the imaging element 18. The peripheral illuminance reduction correction (shading correction) is performed by storing correction data for use in the peripheral illuminance reduction correction beforehand, and multiplying a photographed image (pixels) with the correction data. Since the reduction in peripheral illuminance mainly occurs due to incident angle dependence of sensitivity of the imaging element 18, lens vignetting, cosine fourth law and the like, the correction data is set at such a specified value as to correct an illuminance reduction caused by these factors. By employing such a configuration, it is possible to generate an image having a sufficient illuminance up to the periphery, even if peripheral illuminance is reduced in an optical image of an object introduced to the imaging element 18 by the imaging optical system 1.

In this embodiment, shading correction may be performed by setting the pitch of color filters or the pitch of microlenses of an on-chip microlens array slightly smaller than the pixel pitch of the imaging surface of the imaging element 18 for reducing the shading. In the above modification, setting the pitch of color filters or the pitch of microlenses slightly smaller than the pixel pitch causes shift of the color filters or the microlenses of the on-chip microlens array with respect to each of the pixels toward the optical axis of the imaging optical system 1, as light is incident toward the periphery of the imaging surface of the imaging element 18. Accordingly, it is possible to efficiently guide an obliquely incident light flux to the light receiving portion of each pixel. This is advantageous in reducing shading generated on the imaging element 18.

The driving section 34 drives the lens elements for focusing in the imaging optical system 1 so as to perform focusing as required by causing the unillustrated lens driving device to actuate based on a control signal to be outputted from the control section 35.

The control section 35 is provided with a microprocessor and peripheral circuits thereof, and controls the operations of the respective parts i.e. the imaging section 30, the image generating section 31, the image data buffer 32, the image processing section 33, the driving section 34, the storage section 36, and the I/F section 37 in accordance with the respective functions thereof. In other words, the control section 35 controls the imaging device 21 to execute at least one of a still image photographing and a moving image photographing of an object.

The storage section 36 is a storage circuit for storing image data generated by a still image photographing or a moving image photographing of an object. For instance, the storage section 36 is constituted of an ROM (Read Only Memory), which is a non-volatile storage element, an EEPROM (Electrically Erasable Programmable Read Only memory), which is a rewritable non-volatile storage element, and an RAM. In other words, the storage section 36 has a function as a still image memory and a moving image memory.

The I/F section 37 is an interface through which image data is transmitted and received to and from an external device.

Examples of the I/F section 37 are interfaces in accordance with the standards such as USB or IEEE1394.

In the following, an imaging operation to be performed by the digital apparatus 3 having the above configuration is described.

In the case where a still image is photographed, the control section 35 controls the imaging device 21 to perform the still image photographing, and controls the driving section 34 to actuate the unillustrated lens driving device of the imaging device 21 for moving all the lens elements, whereby focusing is performed. By the above control, a focused optical image is repeatedly and cyclically formed on the light receiving surface of the imaging element 18, and is converted into image signals of the respective color components of R, G and B. Thereafter, the image signals are outputted to the image generating section 31. The image signals are temporarily stored in the image data buffer 32, and are subjected to an image processing by the image processing section 33. Thereafter, an image based on the processed image signals is displayed on a display (not shown). Then, the photographer is allowed to adjust the position of the main object so that the main object is located at an intended position within a screen while viewing the display. When a shutter button (not shown) is depressed in this state, image data is stored in the storage element 36 as a still image memory. Thus, a still image is obtained.

Further, in the case where a moving image is photographed, the control section 35 controls the imaging device 21 to perform the moving image photographing. Then, the photographer is allowed to adjust the position of the image of the object obtained by the imaging device 21 so that the image of the object is located at an intended position within a screen while viewing the display (not shown) substantially in the same manner as the still image photographing. When the photographer depresses the shutter button (not shown) in this state, the moving image photographing is started. At the time of the moving image photographing, the control section 35 controls the imaging device 21 to perform the moving image photographing, and controls the driving section 34 to actuate the unillustrated lens driving device of the imaging device 21, whereby focusing is performed. By the above control, a focused optical image is repeatedly and cyclically formed on the light receiving surface of the imaging element 18, and is converted into image signals of the respective color components of R, G and B. Thereafter, the converted image signals are outputted to the image generating section 31. The image signals are temporarily stored in the image data buffer 32, and are subjected to an image processing by the image processing section 33. Thereafter, an image based on the processed image signals is displayed on the display (not shown). When the photographer depresses the shutter button (not shown) again, the moving image photographing is ended. The photographed moving image is stored in the storage element 36 as a moving image memory.

In the aforementioned configuration, it is possible to provide the imaging device 21 and the digital apparatus 3 incorporated with the imaging optical system 1 having five lens elements and capable of correcting various aberrations in a satisfactory manner, while achieving ultra-miniaturization. In particular, ultra-miniaturization and high performance are achieved in the imaging optical system 1. Accordingly, it is possible to employ a high-pixel imaging element 18, while achieving miniaturization. In particular, since the imaging optical system 1 is ultra-compact and is applicable to a high-pixel imaging element, the imaging optical system 1 is advantageously used in a mobile terminal device having a high pixel density and enhanced functions. The following is an example of a configuration, in which the imaging device 21 is loaded in a mobile phone.

Figure 5A:
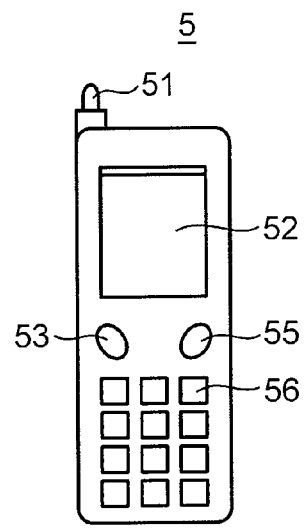
FIG. 5 is an external configuration diagram of a camera-mounted mobile phone as an example of the digital apparatus.
Figure 5B:
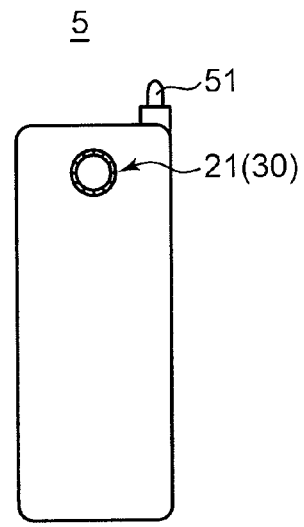
Figure 6:
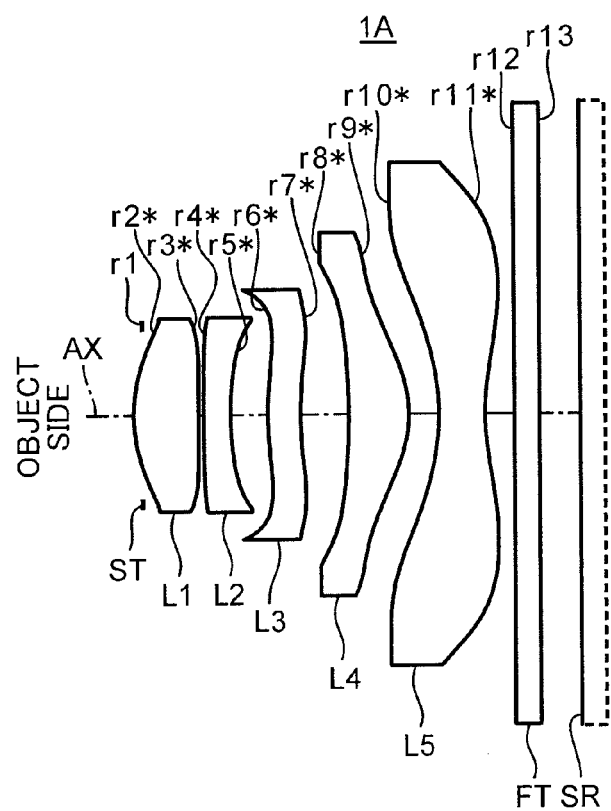
FIG. 6 is a cross-sectional view showing a configuration of lens elements in an imaging optical system as Example 1.
Figure 7:
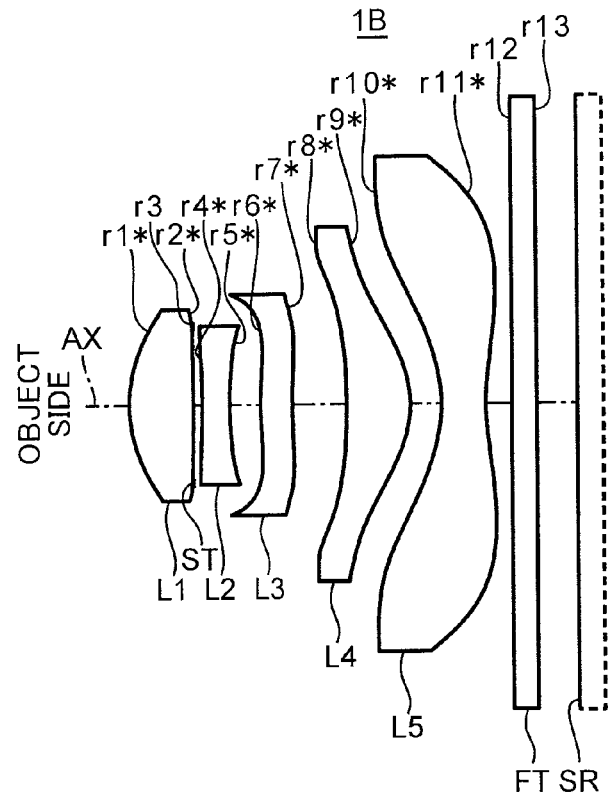
FIG. 7 is a cross-sectional view showing a configuration of lens elements in an imaging optical system as Example 2.
Figure 8:
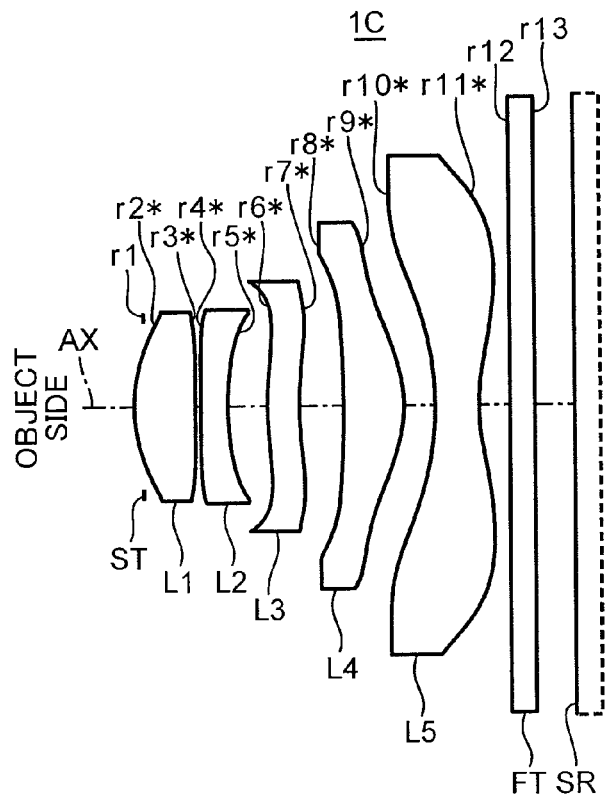
FIG. 8 is a cross-sectional view showing a configuration of lens elements in an imaging optical system as Example 3.
Figure 9:
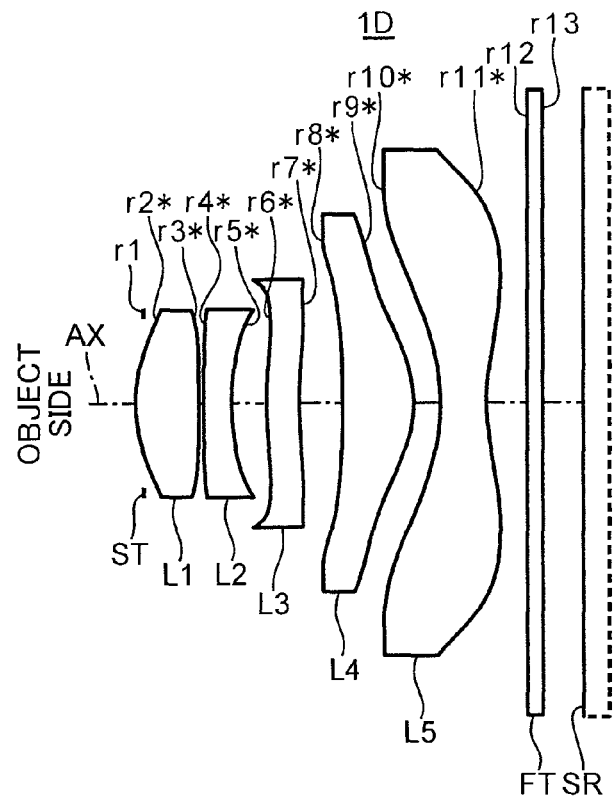
FIG. 9 is a cross-sectional view showing a configuration of lens elements in an imaging optical system as Example 4.
Figure 10:
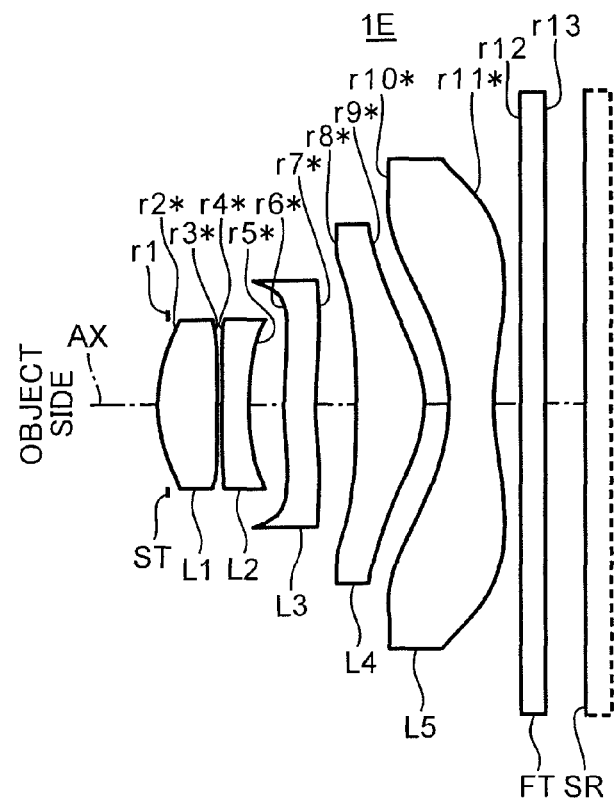
FIG. 10 is a cross-sectional view showing a configuration of lens elements in an imaging optical system as Example 5.
Figure 11:
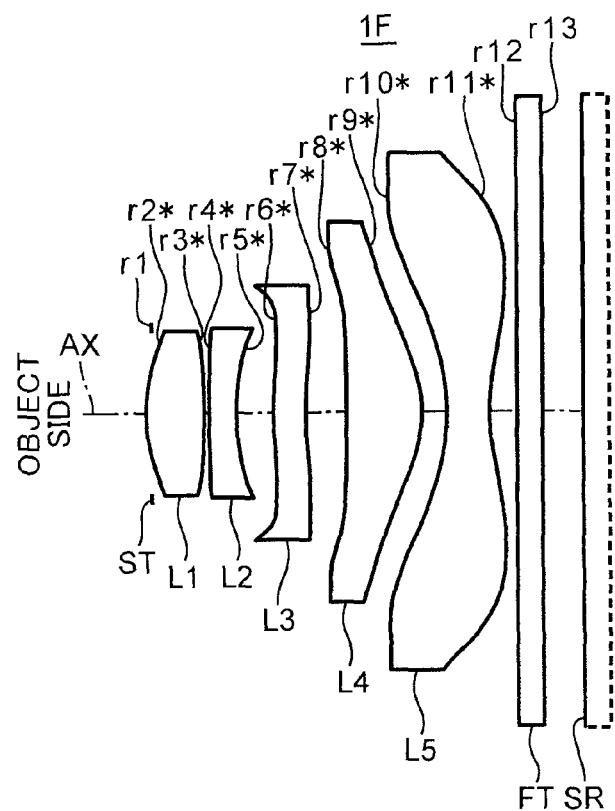
FIG. 11 is a cross-sectional view showing a configuration of lens elements in an imaging optical system as Example 6.
Figure 12:
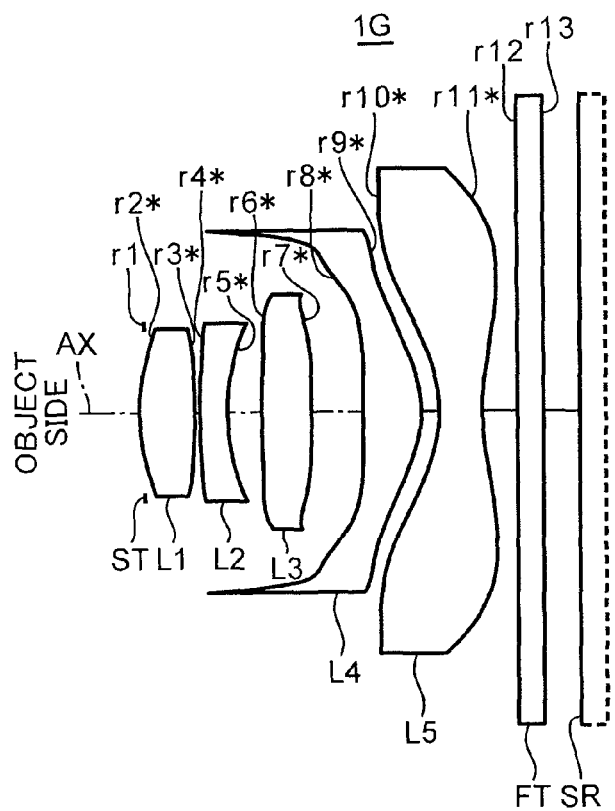
FIG. 12 is a cross-sectional view showing a configuration of lens elements in an imaging optical system as Example 7.
Figure 13:
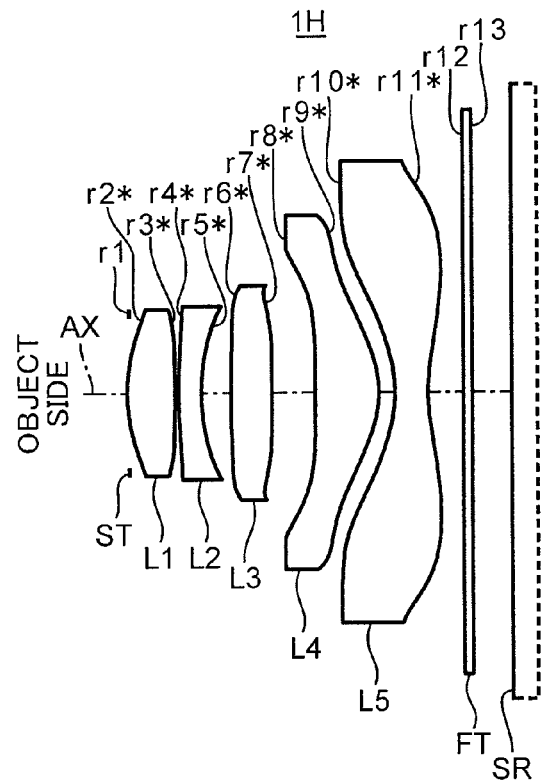
FIG. 13 is a cross-sectional view showing a configuration of lens elements in an imaging optical system as Example 8.
Figure 14:
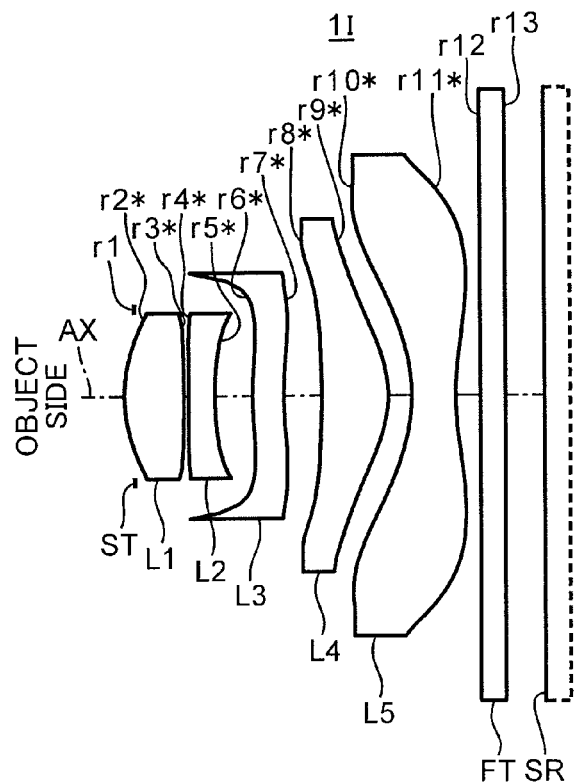
FIG. 14 is a cross-sectional view showing a configuration of lens elements in an imaging optical system as Example 9.
Figure 16A:
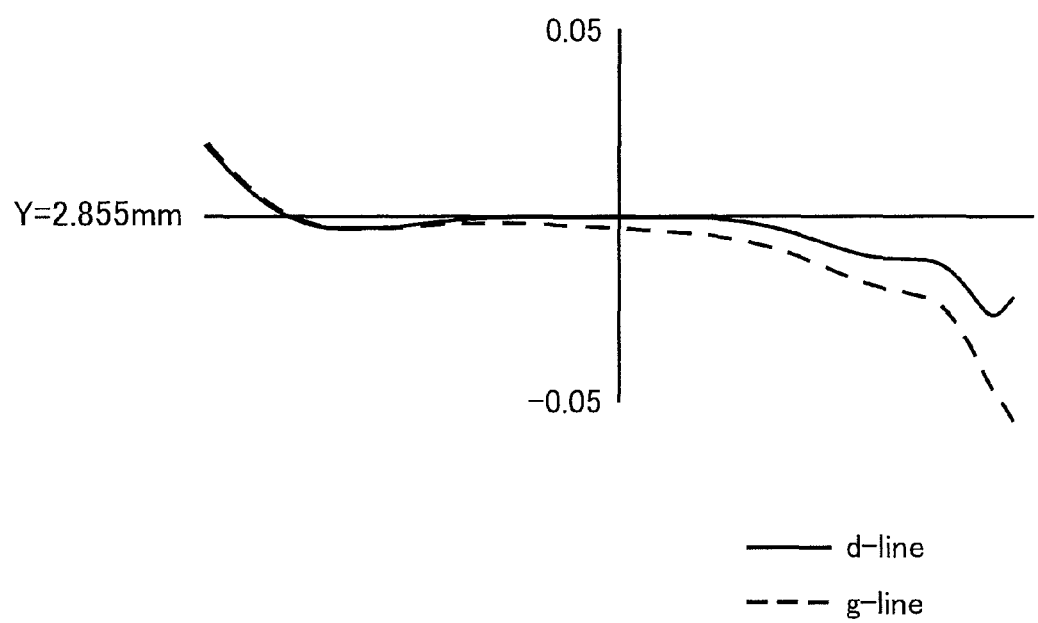
FIGS. 16A and 16B are transverse aberration diagrams of the imaging optical system as Example 1.
Figure 16B:
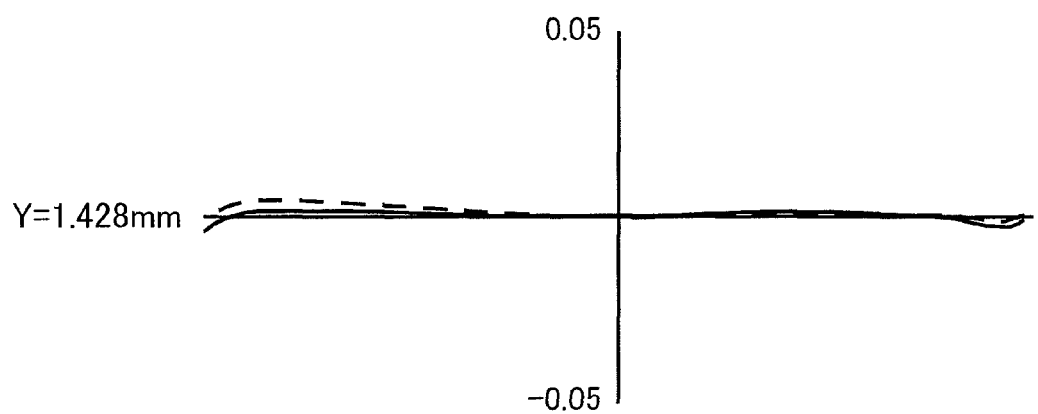
Figure 18A:
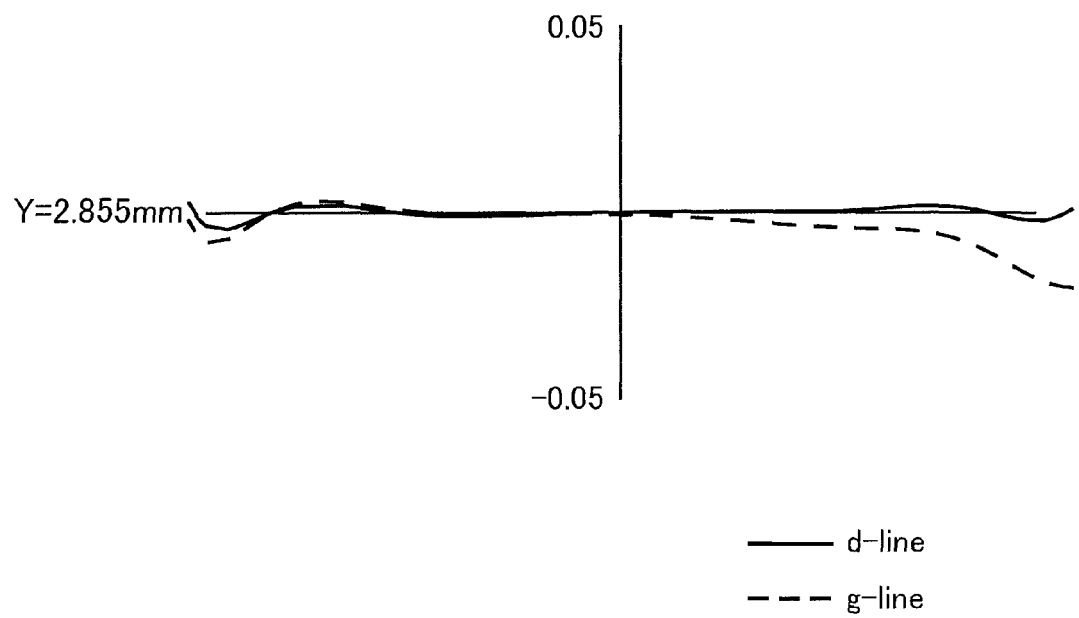
FIGS. 18A and 18B are transverse aberration diagrams of the imaging optical system as Example 2.
Figure 18B:
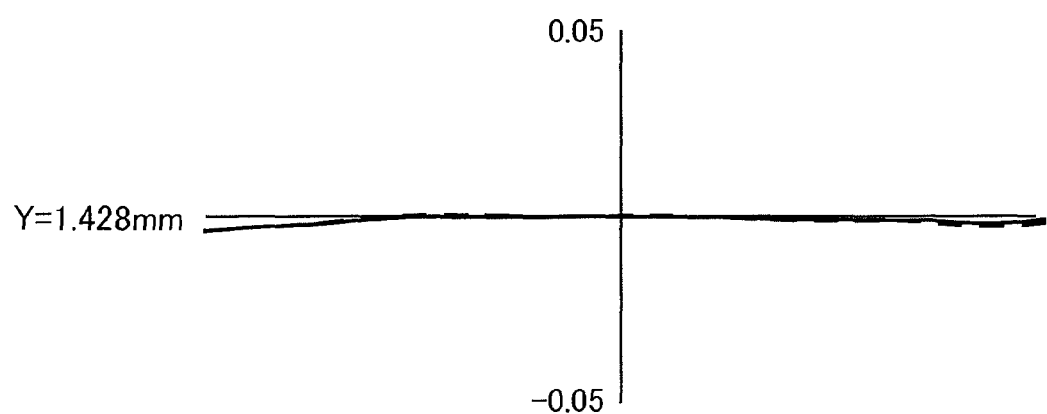
Figure 20A:
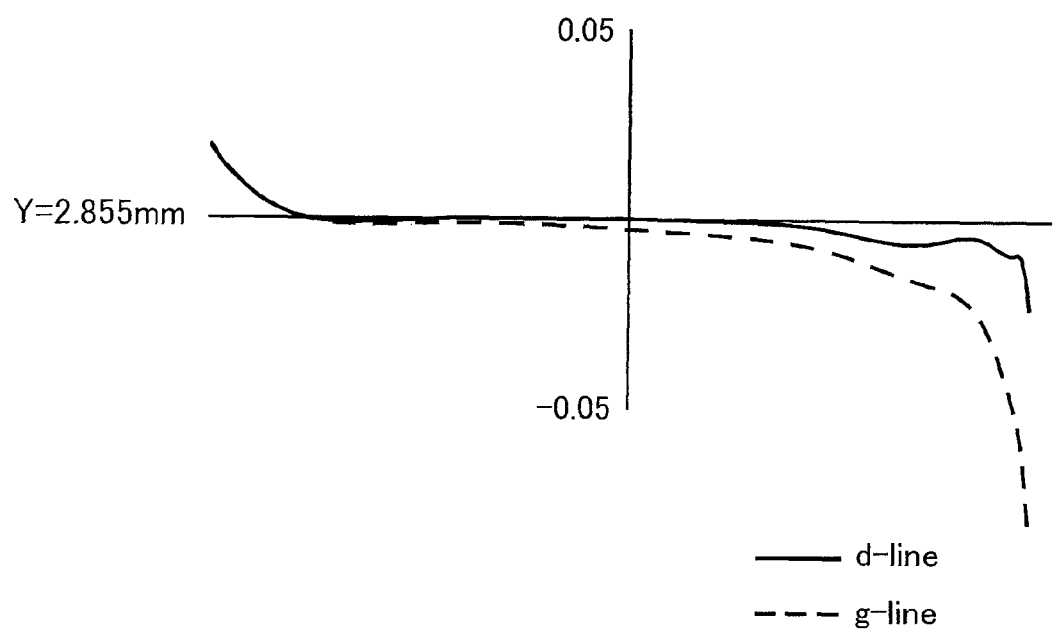
FIGS. 20A and 20B are transverse aberration diagrams of the imaging optical system as Example 3.
Figure 20B:
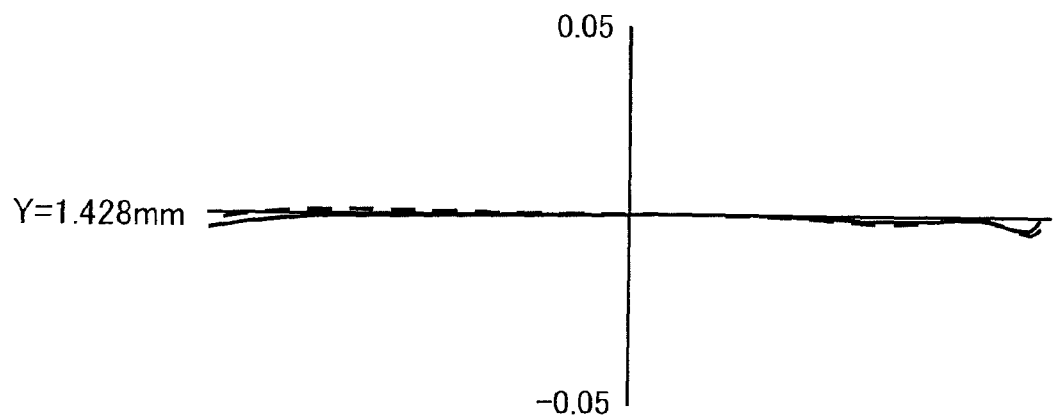
Figure 22A:
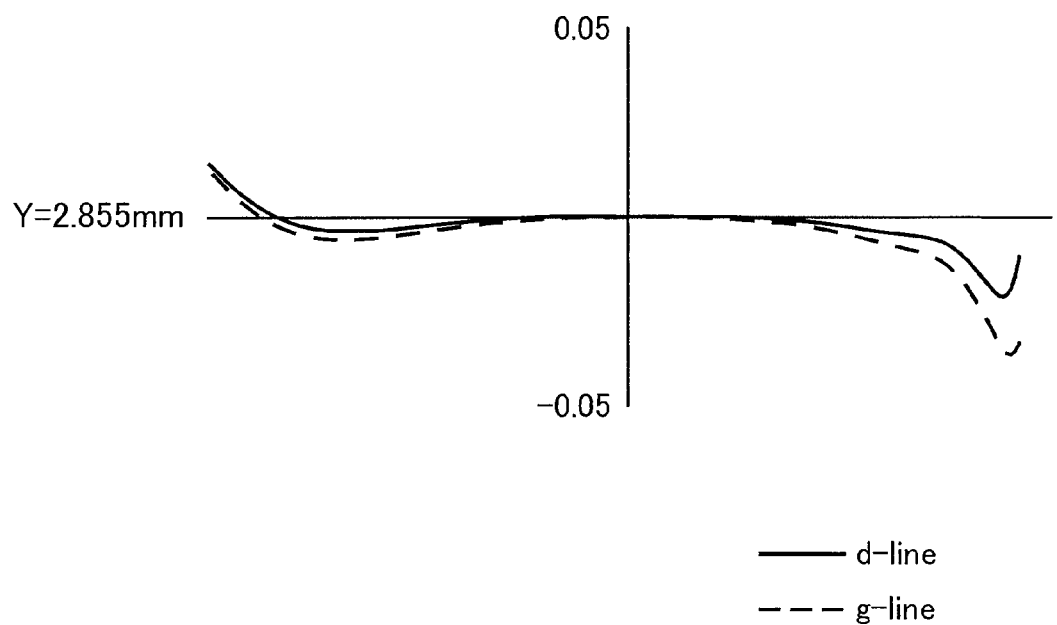
FIGS. 22A and 22B are transverse aberration diagrams of the imaging optical system as Example 4.
Figure 22B:
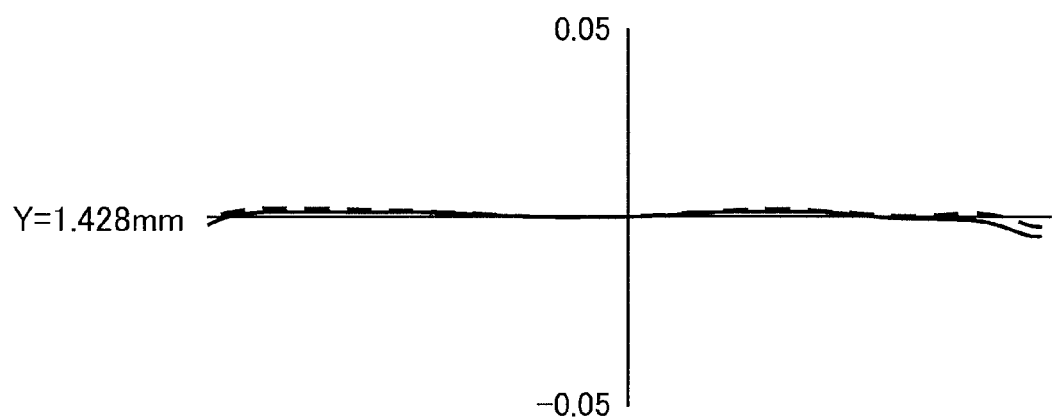
Figure 24A:
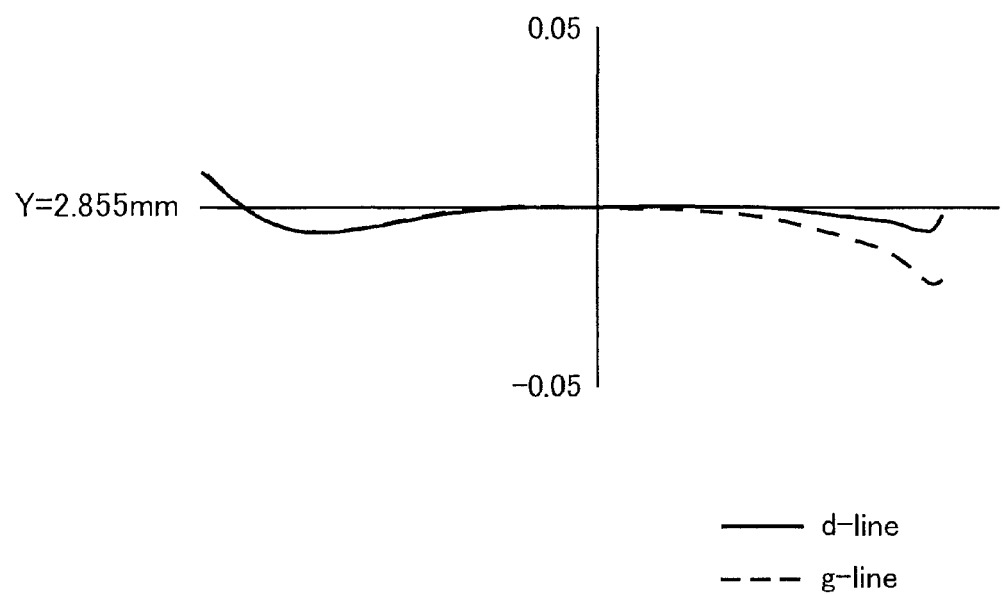
FIGS. 24A and 24B are transverse aberration diagrams of the imaging optical system as Example 5.
Figure 24B:
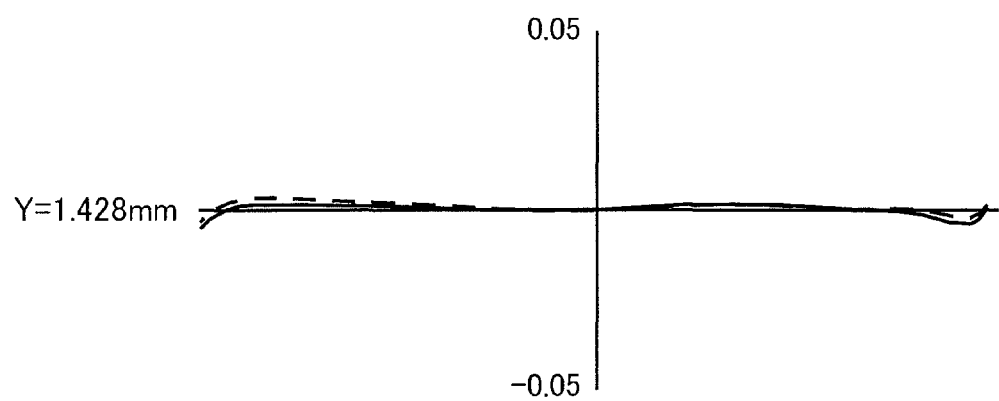
Figure 26A:
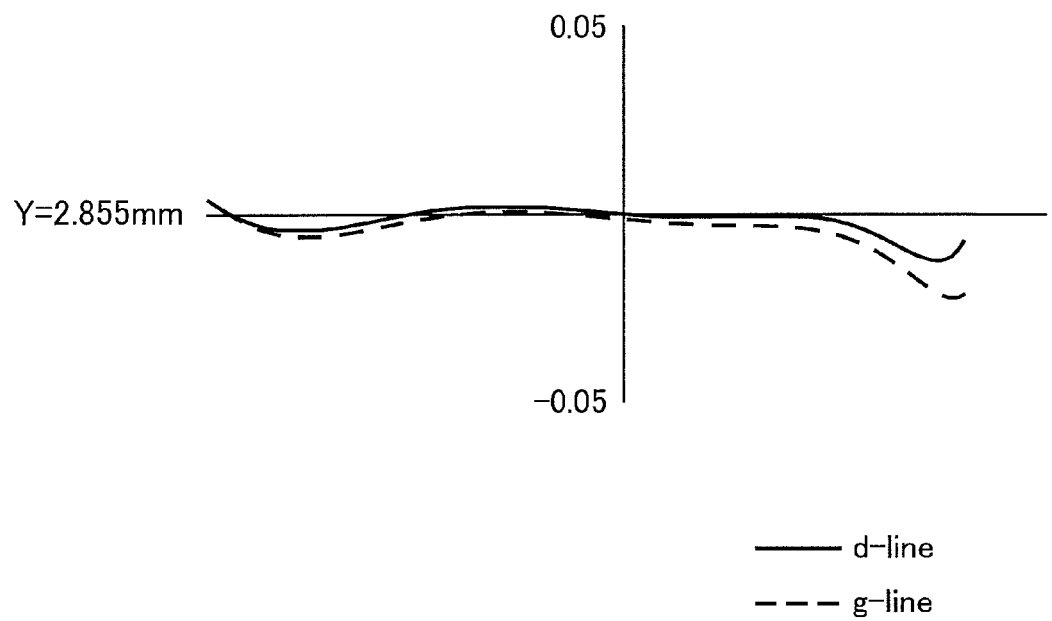
FIGS. 26A and 26B are transverse aberration diagrams of the imaging optical system as Example 6.
Figure 26B:
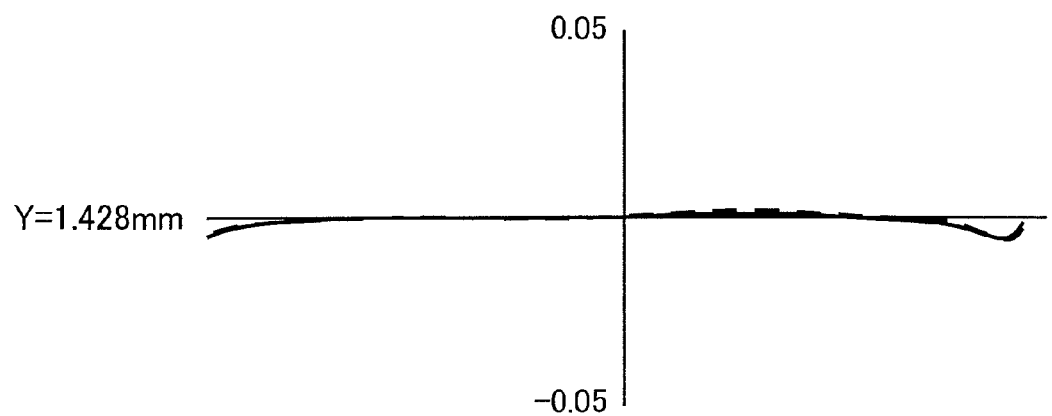
Figure 28A:
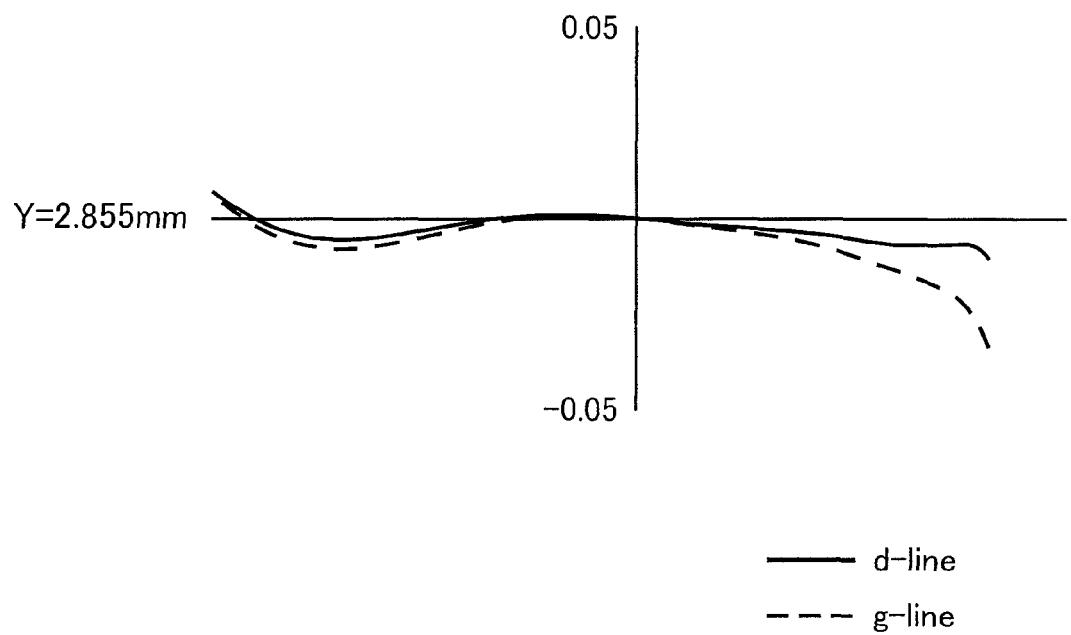
FIGS. 28A and 28B are transverse aberration diagrams of the imaging optical system as Example 7.
Figure 28B:
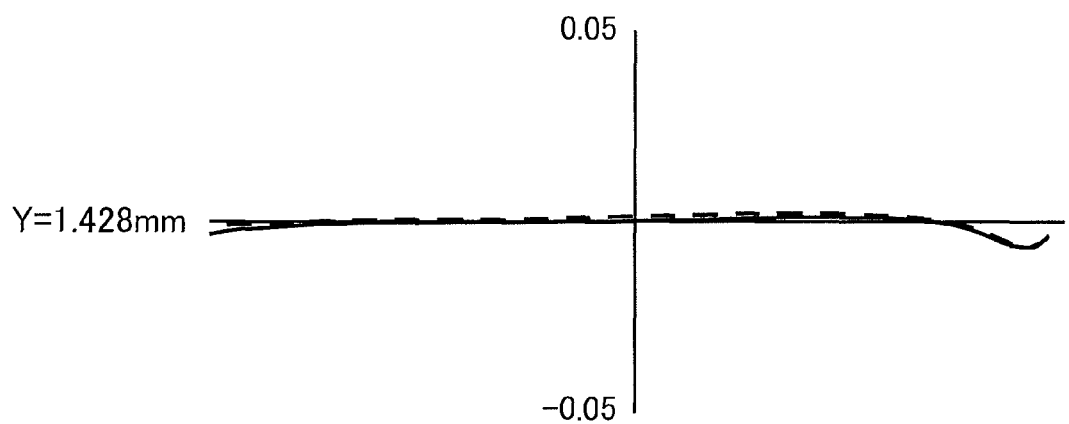
Figure 30A:
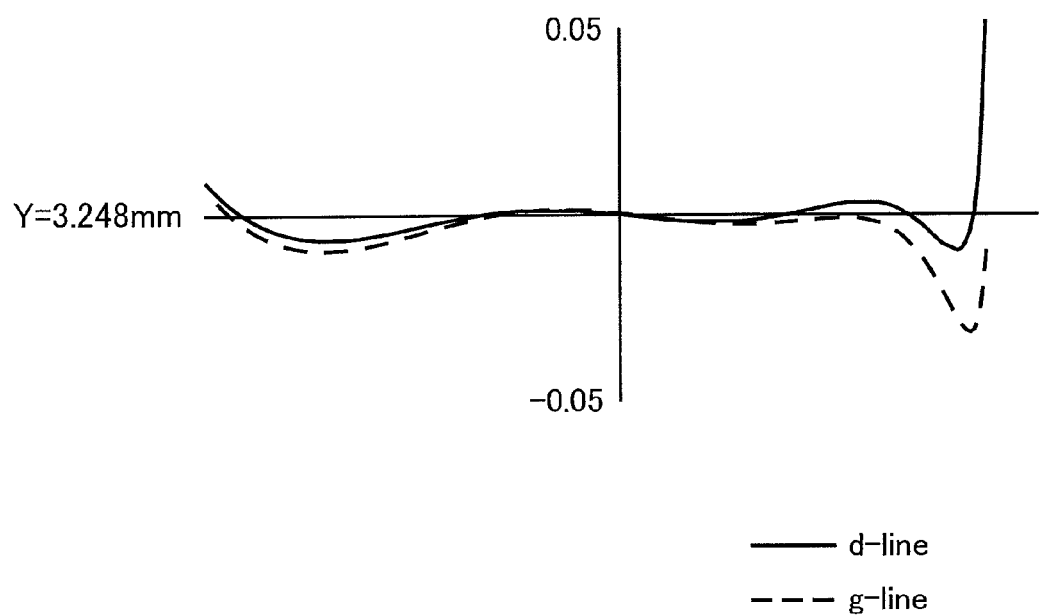
FIGS. 30A and 30B are transverse aberration diagrams of the imaging optical system as Example 8.
Figure 30B:
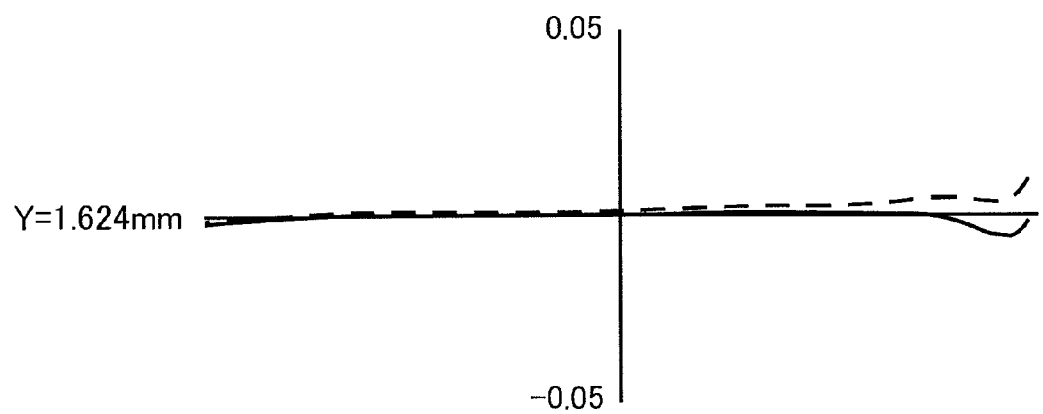
Figure 32A:
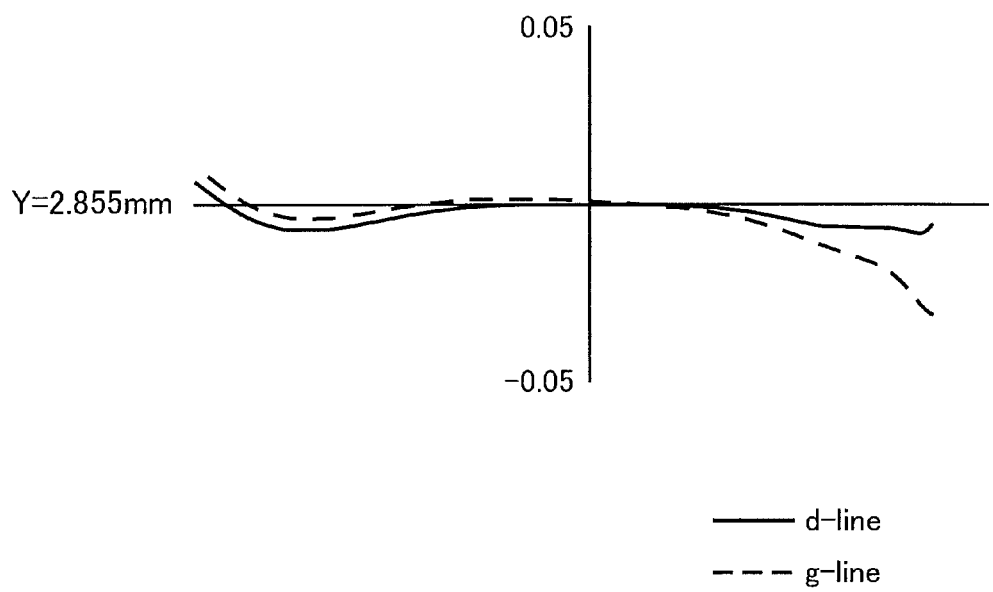
FIGS. 32A and 32B are transverse aberration diagrams of the imaging optical system as Example 9.
Figure 32B:
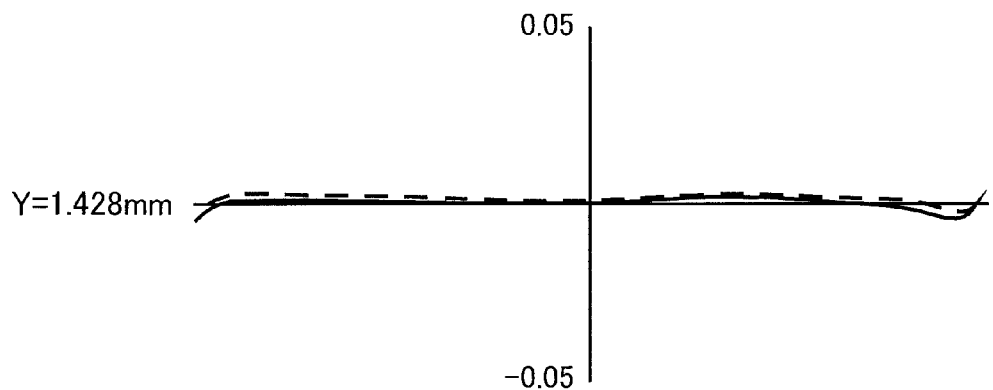

FIGS. 5A and 5B are external configuration diagrams of a camera-mounted mobile phone, as an example of the digital apparatus. FIG. 5A shows an operation surface of the mobile phone, and FIG. 5B shows a back surface opposite to the operation surface, namely, a back surface of the mobile phone.

Referring to FIGS. 5A and 5B, a mobile phone 5 is provided with an antenna 51 at an upper portion thereof. As shown in FIG. 5A, there are mounted, on the operation surface of the mobile phone 5, a rectangular display 52, an image photographing button 53 for allowing the user to activate the image photographing mode and to switch the image photographing mode between the still image photographing and the moving image photographing, a shutter button 55, and a dial button 56.

Further, the mobile phone 5 is built in with a circuit for implementing a telephone function using a mobile telephone network. The mobile phone 5 is further built in with the imaging section 30, the image generating section 31, the image data buffer 32, the image processing section 33, the driving section 34, the control section 35, and the storage section 36. The imaging device 21 of the imaging section 30 is exposed to the outside through the back surface of the mobile phone 5.

In response to user's operation of the image photographing button 53, a control signal representing the operation contents instructed by the user is outputted to the control section 35. Then, the control section 35 executes operations in accordance with the operation contents, such as activation and execution of the still image photographing mode, or activation and execution of the moving image photographing mode. Then, in response to user's operation of the shutter button 55, a control signal representing the operation contents is outputted to the control section 35. Then, the control section 35 executes operations in accordance with the operation contents such as still image photographing or moving image photographing.

<Description on Practical Examples of Imaging Optical System>

In the following, practical constructions of the imaging optical system 1 as shown in FIG. 1, in other words, of the imaging optical system 1 incorporated in the imaging device 21 to be loaded in the digital apparatus 3 as shown in FIGS. 5A and 5B are described with reference to the drawings.

EXAMPLES

FIGS. 6 to 14 are cross sectional views showing a lens configuration of imaging optical systems as Examples 1 to 9.

FIGS. 15A to 32B are aberration diagrams of the imaging optical systems as Examples 1 to 9.

As shown in FIGS. 6 to 14, imaging optical systems 1A to 1I as Examples 1 to 9 are respectively configured such that a first lens element L1, a second lens element L2, a third lens element L3, a fourth lens element L4, and a fifth lens element L5 are disposed in this order from the object side to the image side. In performing a focusing operation, all the first to fifth lens elements L1 to L5 are integrally moved in the optical axis AX direction.

More specifically, in the imaging optical systems 1A to 1I as Examples 1 to 9, the first to fifth lens elements L1 to L5 are configured as follows in the order from the object side to the image side.

In the case of Example 1, Example 3, Example 4, Example 5, and Example 6, the first lens element L1 is a biconvex positive lens element having a positive refractive power, the second lens element L2 is a negative meniscus lens element having a negative refractive power, with a concave surface toward the image side, the third lens element L3 is a positive meniscus lens element having a positive refractive power, with a convex surface toward the object side, the fourth lens element L4 is a positive meniscus lens element having a positive refractive power, with a convex surface toward the image side, and the fifth lens element L5 is a biconcave negative lens element having a negative refractive power.

Further, Example 7 and Example 8 are different from Example 1, Example 3, Example 4, Example 5, and Example 6 in the lens configuration of the third lens element L3 and the fourth lens element L4. Specifically, in the case of Example 7 and Example 8, the first lens element L1 is a biconvex positive lens element having a positive refractive power, the second lens element L2 is a negative meniscus lens element having a negative refractive power, with a concave surface toward the image side, the third lens element L3 is a convex lens element having a positive refractive power, with a convex surface toward the object side and a flat surface on one surface thereof, the fourth lens element L4 is a biconvex positive lens element having a positive refractive power, and the fifth lens element L5 is a biconcave negative lens element having a negative refractive power.

In Example 1, Example 3, Example 4, Example 5, Example 6, Example 7, and Example 8, both surfaces of each of the first to fifth lens elements L1 to L5 have an aspherical shape.

Further, Example 9 is different from Example 1, Example 3, Example 4, Example 5, and Example 6 in the lens configuration of the second lens element L2, and in a point that the third lens element L3 has a negative refractive power. Specifically, in the case of Example 9, the first lens element L1 is a biconvex positive lens element having a positive refractive power, the second lens element L2 is a biconcave negative lens element having a negative refractive power, the third lens element L3 is a negative meniscus lens element having a negative refractive power, with a convex surface toward the object side, the fourth lens element L4 is a positive meniscus lens element having a positive refractive power, with a convex surface toward the image side, and the fifth lens element L5 is a biconcave negative lens element having a negative refractive power.

In Example 1 and in Examples 3 to 9, an optical diaphragm ST is disposed on the object side of the first lens element L1, which is disposed at a position closest to the object side. On the other hand, in Example 2, an optical diaphragm ST is disposed between the first lens element L1 and the second lens element L2. Further, in Example 2, the lens configuration of the second lens element L2 is different. Specifically, in the case of Example 2, the first lens element L1 is a biconvex positive lens element having a positive refractive power, the second lens element L2 is a biconcave negative lens element having a negative refractive power, the third lens element L3 is a positive meniscus lens element having a positive refractive power, with a convex surface toward the object side, the fourth lens element L4 is a positive meniscus lens element having a positive refractive power, with a convex surface toward the image side, and the fifth lens element L5 is a biconcave negative lens element having a negative refractive power, with a concave surface toward the image side.

In Example 9 and in Example 2, both surfaces of each of the first to fifth lens elements L1 to L5 also have an aspherical shape. In Examples 1 to 9, the first to fifth lens elements L1 to L5 are resin lens elements.

The optical diaphragm ST may be an aperture stop, a mechanical shutter, or a variable aperture stop in each of Examples 1 to 9.

Further, the light receiving surface of an imaging element SR is disposed on the image side of the fifth lens element L5 via a parallel plate FT as a filter. The parallel plate FT may be one of the optical filters or a cover glass for the imaging element SR.

In FIGS. 6 to 14, the symbol "ri" (i=1, 2, 3, attached to each of the lens surfaces indicates the i-th lens surface counted from the object side. It should be noted that a surface of a cemented lens is counted as a lens surface. The surface attached with the asterisk "*" to the symbol "ri" indicates an aspherical surface. It should be noted that both surfaces of the parallel plate FT, and the light receiving surface of the imaging element SR are also regarded as a surface, and both surfaces of the optical diaphragm ST are also regarded as a surface. The aforementioned handling and definition on the symbols also hold true to each of the examples. However, this does not mean that everything is the same between the examples. For instance, throughout the drawings showing the respective examples, the lens surface closest to the object is attached with the same symbol "ri". However, as shown in the construction data to be described later, this does not mean that the curvatures of the lens surfaces attached with the same symbol are identical to each other throughout Examples 1 to 9.

In each of Examples 1, and 3 to 9 having the above configuration, light rays incident from the object side successively pass through the optical diaphragm ST, the first lens element L1, the second lens element L2, the third lens element L3, the fourth lens element L4, the fifth lens element L5, and the parallel plate FT along the optical axis AX, and form an optical image of an object on the light receiving surface of the imaging element SR. Further, in Example 2, light rays incident from the object side successively pass through the first lens element L1, the optical diaphragm ST, the second lens element L2, the third lens element L3, the fourth lens element L4, the fifth lens element L5, and the parallel plate FT along the optical axis AX, and form an optical image of an object on the light receiving surface of the imaging element SR. Then, in each of Examples 1 to 9, the imaging element SR converts the optical image into an electrical signal. The electrical signal is applied with a specified digital image processing as necessary, and is stored as a digital image signal in a memory of a digital apparatus such as a digital camera, or transmitted to another digital apparatus by wired or wireless communication through an interface.

Construction data of the respective lens elements in the imaging optical systems 1A to 1I as Examples 1 to 9 is as follows.

Construction data of the respective lens elements in the imaging optical system 1A as Example 1 is as follows.
Numerical Value Example 1

| Unit: mm | | | | | |
|---|---|---|---|---|---|
| Lens Surface Data | | | | | |
| lens surface | r | d | nd | vd | ER |
| object plane | ∞ | ∞ | | | |
| 1 (aperture stop) | ∞ | −0.08 | | | 0.78 |
| 2* | 1.518 | 0.64 | 1.54470 | 56.2 | 0.86 |
| 3* | −1000.000 | 0.05 | | | 0.93 |
| 4* | 1000.000 | 0.27 | 1.63470 | 23.9 | 0.94 |
| 5* | 3.261 | 0.37 | | | 0.90 |

-continued

Unit: mm

| | | | | | |
|---|---|---|---|---|---|
| 6* | 2.824 | 0.32 | 1.63470 | 23.9 | 1.01 |
| 7* | 2.950 | 0.47 | | | 1.20 |
| 8* | −6.525 | 0.59 | 1.54470 | 56.2 | 1.46 |
| 9* | −1.101 | 0.30 | | | 1.75 |
| 10* | −2.051 | 0.45 | 1.53050 | 55.7 | 2.16 |
| 11* | 2.041 | 0.29 | | | 2.43 |
| 12 | ∞ | 0.25 | 1.51630 | 64.1 | 3.00 |
| 13 | ∞ | | | | 3.00 |
| image plane | ∞ | | | | |

Aspherical Surface Data

Second surface

K = −0.29027E+00, A4 = −0.82313E−02, A6 = −0.81388E−02,
A8 = −0.51285E−01, A10 = 0.29680E−01, A12 = 0.14629E−01,
A14 = −0.90037E−01
Third surface K = 0.30000E+02, A4 = −0.31504E−01, A6 = −0.81896E−01,
A8 = 0.22070E−01, A10 = −0.40338E−01, A12 = −0.28723E−01,
A14 = 0.27019E−01
Fourth surface K = −0.30000E+02, A4 = 0.29457E−01, A6 = 0.42102E−01,
A8 = −0.73497E−01, A10 = 0.16392E−01, A12 = 0.41296E−01,
A14 = 0.50101E−02
Fifth surface K = −0.23076E+02, A4 = 0.11688E+00, A6 = 0.64850E−01,
A8 = −0.42136E−01, A10 = 0.80560E−02, A12 = 0.54432E−01,
A14 = 0.45283E−02
Sixth surface K = −0.10345E+02, A4 = −0.13848E+00, A6 = 0.19916E−01,
A8 = −0.35742E−02, A10 = −0.31539E−01, A12 = 0.22239E−01,
A14 = −0.14677E−01
Seventh surface K = −0.89520E+01, A4 = −0.10260E+00, A6 = −0.15702E−01,
A8 = 0.14854E−01, A10 = −0.32073E−02, A12 = −0.77848E−02,
A14 = 0.67620E−02
Eighth surface K = 0.14640E+02, A4 = 0.39661E−02, A6 = 0.18337E−01,
A8 = −0.23554E−01, A10 = −0.15677E−02, A12 = 0.44238E−02,
A14 = −0.53943E−03
Ninth surface K = −0.25327E+01, A4 = 0.23128E−01, A6 = 0.35049E−01,
A8 = −0.11184E−01, A10 = −0.41345E−03, A12 = 0.31353E−03,
A14 = −0.20704E−04
Tenth surface K = −0.87569E+01, A4 = −0.51776E−01, A6 = 0.19266E−01,
A8 = 0.10403E−04, A10 = −0.45571E−03, A12 = −0.96053E−05,
A14 = 0.72089E−05
Eleventh surface K = −0.11328E+02, A4 = −0.64293E−01, A6 = 0.18975E−01,
A8 = −0.40948E−02, A10 = 0.35600E−03, A12 = −0.10395E−04,
A14 = 0.73044E−06

Various Data

| | |
|---|---|
| focal length (f) | 3.76 (mm) |
| F-number (Fno) | 2.4 |
| diagonal length (2Y) of imaging surface | 5.71 (mm) |
| back focus (Bf) | 0.39 (mm) |
| total length (TL) of lens system | 0.74 (mm) |
| ENTP | 0 (mm) |
| EXTP | −2.18 (mm) |
| H1 | −1.73 (mm) |
| H2 | −3.36 (mm) |

-continued

Unit: mm

Focal length (mm) of each lens element

| | |
|---|---|
| first lens element L1 | 2.784 |
| second lens element L2 | −5.156 |
| third lens element L3 | 52.424 |
| fourth lens element L4 | 2.341 |
| fifth lens element L5 | −1.858 |

Construction data of the respective lens elements in the imaging optical system 1B as Example 2 is as follows.

Numerical Value Example 2

Unit: mm

Lens Surface Data

| lens surface | r | d | nd | vd | ER |
|---|---|---|---|---|---|
| object plane | ∞ | ∞ | | | |
| 1* | 1.419 | 0.63 | 1.54470 | 56.2 | 0.94 |
| 2* | −72.927 | 0.00 | | | 0.72 |
| 3 (aperture stop) | ∞ | 0.08 | | | 0.70 |
| 4* | −6.363 | 0.27 | 1.63470 | 23.9 | 0.71 |
| 5* | 4.670 | 0.30 | | | 0.77 |
| 6* | 3.804 | 0.32 | 1.63470 | 23.9 | 0.88 |
| 7* | 4.813 | 0.53 | | | 1.08 |
| 8* | −6.342 | 0.61 | 1.54470 | 56.2 | 1.54 |
| 9* | −1.027 | 0.30 | | | 1.73 |
| 10* | −1.461 | 0.44 | 1.53050 | 55.7 | 2.10 |
| 11* | 2.396 | 0.25 | | | 2.42 |
| 12 | ∞ | 0.25 | 1.51630 | 64.1 | 3.00 |
| 13 | ∞ | | | | 3.00 |
| image plane | ∞ | | | | |

Aspherical Surface Data

First surface

K = −0.14183E+00, A4 = −0.85545E−02, A6 = 0.40828E−01,
A8 = −0.10074E+00, A10 = 0.51955E−01, A12 = 0.46179E−01,
A14 = −0.79179E−01
Second surface K = 0.30000E+02, A4 = −0.41234E−01, A6 = 0.78086E−01,
A8 = −0.25757E−01, A10 = −0.88276E−01, A12 = −0.90012E−01,
A14 = 0.11216E+00
Fourth surface K = 0.26704E+02, A4 = 0.14879E−01, A6 = 0.25146E+00,
A8 = −0.19159E+00, A10 = −0.11863E+00, A12 = 0.16508E+00,
A14 = 0.12823E−01
Fifth surface K = −0.29996E+02, A4 = 0.33495E−01, A6 = 0.19469E+00,
A8 = −0.64014E−01, A10 = −0.18806E+00, A12 = 0.19619E+00,
A14 = 0.51591E−01
Sixth surface K = −0.25333E+02, A4 = −0.20363E+00, A6 = 0.51692E−01,
A8 = −0.11496E+00, A10 = −0.40521E−01, A12 = 0.17449E+00,
A14 = −0.12238E+00
Seventh surface K = −0.25485E+02, A4 = −0.13598E+00, A6 = −0.20503E−01,
A8 = 0.19273E−01, A10 = −0.19449E−01, A12 = 0.52332E−03,
A14 = 0.20181E−01
Eighth surface K = 0.10140E+02, A4 = −0.47956E−01, A6 = 0.59804E−01,
A8 = −0.47223E−01, A10 = 0.21547E−02, A12 = 0.93561E−02,
A14 = −0.21573E−02

-continued

Unit: mm

Ninth surface

K = −0.34246E+01, A4 = −0.76477E−01, A6 = 0.72414E−01,
A8 = −0.10321E−01, A10 = −0.23037E−02, A12 = −0.42826E−04,
A14 = 0.15040E−03

Tenth surface

K = −0.48694E+01, A4 = −0.42618E−01, A6 = 0.19129E−01,
A8 = −0.38964E−03, A10 = −0.46329E−03, A12 = 0.28426E−05,
A14 = 0.67580E−05

Eleventh surface

K = −0.24471E+02, A4 = −0.47980E−01, A6 = 0.13315E−01,
A8 = −0.32578E−02, A10 = 0.35785E−03, A12 = −0.24204E−04,
A14 = 0.14902E−05

Various Data

| | |
|---|---|
| focal length (f) | 3.75 (mm) |
| F-number (Fno) | 2.38 |
| diagonal length (2Y) of imaging surface | 5.71 (mm) |
| back focus (Bf) | 0.37 (mm) |
| total length (TL) of lens system | 0.75 (mm) |
| ENTP | 0.49 (mm) |
| EXTP | −1.97 (mm) |
| H1 | −1.77 (mm) |
| H2 | −3.38 (mm) |

Focal length (mm) of each lens element

| | |
|---|---|
| first lens element L1 | 2.563 |
| second lens element L2 | −4.203 |
| third lens element L3 | 25.449 |
| fourth lens element L4 | 2.161 |
| fifth lens element L5 | −1.646 |

Construction data of the respective lens elements in the imaging optical system 1C as Example 3 is as follows.

Numerical Value Example 3

Unit: mm

Lens Surface Data

| lens surface | r | d | nd | vd | ER |
|---|---|---|---|---|---|
| object plane | ∞ | ∞ | | | |
| 1 (aperture stop) | ∞ | −0.09 | | | 0.78 |
| 2* | 1.50 | 0.61 | 1.54470 | 56.2 | 0.87 |
| 3* | −1000.000 | 0.06 | | | 0.92 |
| 4* | 1000.000 | 0.27 | 1.63470 | 23.9 | 0.94 |
| 5* | 3.072 | 0.40 | | | 0.90 |
| 6* | 2.897 | 0.32 | 1.63470 | 23.9 | 1.03 |
| 7* | 2.952 | 0.44 | | | 1.22 |
| 8* | −11.641 | 0.60 | 1.54470 | 56.2 | 1.48 |
| 9* | −1.229 | 0.31 | | | 1.78 |
| 10* | −3.053 | 0.44 | 1.53050 | 55.7 | 2.16 |
| 11* | 1.701 | 0.31 | | | 2.43 |
| 12 | ∞ | 0.25 | 1.51630 | 64.1 | 3.00 |
| 13 | ∞ | | | | 3.00 |
| image plane | ∞ | | | | |

Aspherical Surface Data

Second surface

K = −0.19125E+00, A4 = −0.47909E−02, A6 = 0.73277E−02,
A8 = −0.64988E−01, A10 = 0.20950E−01, A12 = 0.25629E−01,
A14 = −0.53677E−01

Third surface

K = −0.30000E+02, A4 = −0.11713E−01, A6 = −0.67100E−01,
A8 = 0.31787E−01, A10 = −0.45672E−01, A12 = −0.32439E−01,
A14 = 0.67499E−01

-continued

Unit: mm

Fourth surface

K = 0.30000E+02, A4 = 0.20660E−01, A6 = 0.51262E−01,
A8 = −0.90912E−01, A10 = 0.52914E−01, A12 = 0.70176E−01,
A14 = −0.17266E−01

Fifth surface

K = −0.15757E+02, A4 = 0.89728E−01, A6 = 0.65275E−01,
A8 = −0.13301E−01, A10 = −0.60903E−02, A12 = 0.16612E−01,
A14 = 0.54985E−01

Sixth surface

K = −0.56388E+01, A4 = −0.14663E+00, A6 = 0.30645E−01,
A8 = 0.11496E−02, A10 = −0.57827E−01, A12 = 0.38337E−01,
A14 = −0.11664E−01

Seventh surface

K = −0.87438E+01, A4 = −0.96625E−01, A6 = −0.15483E−01,
A8 = 0.15758E−01, A10 = −0.47816E−02, A12 = −0.11210E−01,
A14 = 0.87067E−02

Eighth surface

K = 0.30000E+02, A4 = −0.70658E−03, A6 = 0.16750E−01,
A8 = −0.25572E−01, A10 = −0.11440E−02, A12 = 0.53739E−02,
A14 = −0.99473E−03

Ninth surface

K = −0.37026E+01, A4 = 0.15837E−02, A6 = 0.35300E−01,
A8 = −0.10549E−01, A10 = −0.13092E−03, A12 = 0.36270E−03,
A14 = −0.55832E−04

Tenth surface

K = −0.72153E+01, A4 = −0.53690E−01, A6 = 0.19083E−01,
A8 = 0.69333E−04, A10 = −0.44049E−03, A12 = −0.65519E−05,
A14 = 0.61311E−05

Eleventh surface

K = −0.11661E+02, A4 = −0.63492E−01, A6 = 0.19267E−01,
A8 = −0.41068E−02, A10 = 0.35017E−03, A12 = −0.12172E−04,
A14 = 0.10072E−05

Various Data

| | |
|---|---|
| focal length (f) | 3.75 (mm) |
| F-number (Fno) | 2.4 |
| diagonal length (2Y) of imaging surface | 5.71 (mm) |
| back focus (Bf) | 0.40 (mm) |
| total length (TL) of lens system | 0.76 (mm) |
| ENTP | 0 (mm) |
| EXTP | −2.17 (mm) |
| H1 | −1.71 (mm) |
| H2 | −3.35 (mm) |

Focal length (mm) of each lens element

| | |
|---|---|
| first lens element L1 | 2.754 |
| second lens element L2 | −4.856 |
| third lens element L3 | 75.230 |
| fourth lens element L4 | 2.472 |
| fifth lens element L5 | −1.995 |

Construction data of the respective lens elements in the imaging optical system 1D as Example 4 is as follows.

Numerical Value Example 4

Unit: mm

Lens Surface Data

| lens surface | r | d | nd | vd | ER |
|---|---|---|---|---|---|
| object plane | ∞ | ∞ | | | |
| 1 (aperture stop) | ∞ | −0.08 | | | 0.78 |
| 2* | 1.528 | 0.62 | 1.54470 | 56.2 | 0.84 |

| | | Unit: mm | | | |
|---|---|---|---|---|---|
| 3* | −12.790 | 0.05 | | | 0.90 |
| 4* | 1000.000 | 0.27 | 1.63470 | 23.9 | 0.90 |
| 5* | 2.531 | 0.34 | | | 0.89 |
| 6* | 3.219 | 0.32 | 1.63470 | 23.9 | 1.00 |
| 7* | 3.675 | 0.44 | | | 1.19 |
| 8* | −8.967 | 0.70 | 1.54470 | 56.2 | 1.53 |
| 9* | −1.036 | 0.26 | | | 1.81 |
| 10* | −1.822 | 0.45 | 1.53050 | 55.7 | 2.16 |
| 11* | 1.931 | 0.40 | | | 2.42 |
| 12 | ∞ | 0.15 | 1.51630 | 64.1 | 3.00 |
| 13 | ∞ | | | | 3.00 |
| image plane | ∞ | | | | |

Aspherical Surface Data

Second surface

K = −0.22757E+00, A4 = −0.70377E−02, A6 = −0.65062E−02,
A8 = −0.49019E−01, A10 = 0.21522E−01, A12 = 0.12909E−01,
A14 = −0.75246E−01
Third surface K = −0.29996E+02, A4 = 0.56998E−02, A6 = −0.93610E−01,
A8 = 0.44027E−01, A10 = −0.45548E−01, A12 = −0.56013E−01,
A14 = 0.49096E−01
Fourth surface K = −0.29991E+02, A4 = 0.18247E−01, A6 = 0.69762E−01,
A8 = −0.12346E+00, A10 = 0.29252E−01, A12 = 0.90823E−01,
A14 = −0.27430E−01
Fifth surface K = −0.11039E+02, A4 = 0.82827E−01, A6 = 0.73444E−01,
A8 = −0.19375E−01, A10 = −0.13815E−01, A12 = 0.10918E−01,
A14 = 0.43951E−01
Sixth surface K = −0.13597E+01, A4 = −0.16650E+00, A6 = 0.39579E−01,
A8 = 0.19115E−01, A10 = −0.43776E−01, A12 = 0.53929E−01,
A14 = −0.34995E−01
Seventh surface K = −0.27903E+02, A4 = −0.60605E−01, A6 = −0.32841E−01,
A8 = 0.15432E−01, A10 = 0.15738E−01, A12 = 0.18178E−02,
A14 = −0.37748E−02
Eighth surface K = 0.28536E+02, A4 = −0.13590E−01, A6 = 0.41805E−01,
A8 = −0.38477E−01, A10 = −0.26340E−02, A12 = 0.10806E−01,
A14 = −0.23676E−02
Ninth surface K = −0.29942E+01, A4 = −0.47786E−02, A6 = 0.57292E−01,
A8 = −0.20301E−01, A10 = −0.86708E−03, A12 = 0.13247E−02,
A14 = −0.16096E−03
Tenth surface K = −0.92067E+01, A4 = −0.54775E−01, A6 = 0.18282E−01,
A8 = 0.16077E−03, A10 = −0.44227E−03, A12 = −0.76147E−05,
A14 = 0.69507E−05
Eleventh surface K = −0.11070E+02, A4 = −0.66057E−01, A6 = 0.19574E−01,
A8 = −0.43202E−02, A10 = 0.37037E−03, A12 = −0.11757E−04,
A14 = 0.11380E−05

Various Data

| | |
|---|---|
| focal length (f) | 3.74 (mm) |
| F-number (Fno) | 2.39 |
| diagonal length (2Y) of imaging surface | 5.71 (mm) |
| back focus (Bf) | 0.40 (mm) |
| total length (TL) of lens system | 0.75 (mm) |
| ENTP | 0 (mm) |
| EXTP | −2.23 (mm) |

| | |
|---|---|
| H1 | −1.58 (mm) |
| H2 | −3.34 (mm) |

Focal length (mm) of each lens element

| | |
|---|---|
| first lens element L1 | 2.545 |
| second lens element L2 | −3.999 |
| third lens element L3 | 32.107 |
| fourth lens element L4 | 2.084 |
| fifth lens element L5 | −1.697 |

Construction data of the respective lens elements in the imaging optical system 1E as Example 5 is as follows.

Numerical Value Example 5

Lens Surface Data

| lens surface | r | d | nd | vd | ER |
|---|---|---|---|---|---|
| object plane | ∞ | ∞ | | | |
| 1 (aperture stop) | ∞ | −0.10 | | | 0.77 |
| 2* | 1.444 | 0.60 | 1.54470 | 56.2 | 0.80 |
| 3* | −33.128 | 0.05 | | | 0.81 |
| 4* | 1000.000 | 0.27 | 1.63470 | 23.9 | 0.80 |
| 5* | 2.861 | 0.35 | | | 0.81 |
| 6* | 3.381 | 0.32 | 1.63470 | 23.9 | 0.97 |
| 7* | 3.678 | 0.43 | | | 1.18 |
| 8* | −8.888 | 0.68 | 1.54470 | 56.2 | 1.52 |
| 9* | −1.052 | 0.25 | | | 1.73 |
| 10* | −1.550 | 0.45 | 1.53050 | 55.7 | 2.07 |
| 11* | 2.261 | 0.27 | | | 2.36 |
| 12 | ∞ | 0.25 | 1.51630 | 64.1 | 3.00 |
| 13 | ∞ | | | | 3.00 |
| image plane | ∞ | | | | |

Aspherical Surface Data

Second surface

K = −0.23360E+00, A4 = −0.58296E−02, A6 = −0.15568E−01,
A8 = −0.53262E−01, A10 = 0.27031E−01, A12 = 0.15800E−01,
A14 = −0.13195E+00
Third surface K = 0.30000E+02, A4 = −0.18033E−01, A6 = −0.96272E−01,
A8 = 0.40108E−01, A10 = −0.60566E−01, A12 = −0.66827E−01,
A14 = 0.57149E−01
Fourth surface K = −0.30000E+02, A4 = 0.27444E−01, A6 = 0.68808E−01,
A8 = −0.12217E+00, A10 = 0.41291E−01, A12 = 0.10017E+00,
A14 = −0.36176E−01
Fifth surface K = −0.10854E+02, A4 = 0.93983E−01, A6 = 0.98346E−01,
A8 = −0.94782E−02, A10 = −0.20367E−01, A12 = 0.13818E−01,
A14 = 0.89429E−01
Sixth surface K = −0.44397E+01, A4 = −0.17471E+00, A6 = 0.44240E−01,
A8 = 0.39542E−02, A10 = −0.43578E−01, A12 = 0.72269E−01,
A14 = −0.57181E−01
Seventh surface K = −0.30000E+02, A4 = −0.67020E−01, A6 = −0.38314E−01,
A8 = 0.20066E−01, A10 = 0.17593E−01, A12 = 0.96421E−03,
A14 = −0.48787E−02

-continued

Unit: mm

Eighth surface

K = 0.27167E+02, A4 = −0.17867E−01, A6 = 0.38188E−01,
A8 = −0.38526E−01, A10 = −0.25044E−02, A12 = 0.11129E−01,
A14 = −0.23688E−02
Ninth surface K = −0.26802E+01, A4 = 0.28685E−02, A6 = 0.56504E−01,
A8 = −0.22208E−01, A10 = −0.97050E−03, A12 = 0.14248E−02,
A14 = −0.12030E−03
Tenth surface K = −0.55671E+01, A4 = −0.54517E−01, A6 = 0.18813E−01,
A8 = 0.36265E−03, A10 = −0.42331E−03, A12 = −0.70959E−05,
A14 = 0.53942E−05
Eleventh surface K = −0.13811E+02, A4 = −0.64541E−01, A6 = 0.18620E−01,
A8 = −0.43960E−02, A10 = 0.39423E−03, A12 = −0.12357E−04,
A14 = 0.14790E−05

Various Data

| | |
|---|---|
| focal length (f) | 3.7 (mm) |
| F-number (Fno) | 2.4 |
| diagonal length (2Y) of imaging surface | 5.71 (mm) |
| back focus (Bf) | 0.40 (mm) |
| total length (TL) of lens system | 0.74 (mm) |
| ENTP | 0 (mm) |
| EXTP | −2.11 (mm) |
| H1 | −1.77 (mm) |
| H2 | −3.3 (mm) |

Focal length (mm) of each lens element

| | |
|---|---|
| first lens element L1 | 2.556 |
| second lens element L2 | −4.520 |
| third lens element L3 | 46.443 |
| fourth lens element L4 | 2.126 |
| fifth lens element L5 | −1.665 |

Construction data of the respective lens elements in the imaging optical system 1F as Example 6 is as follows.
Numerical Value Example 6

Unit: mm

Lens Surface Data

| lens surface | r | d | nd | vd | ER |
|---|---|---|---|---|---|
| object plane | ∞ | ∞ | | | |
| 1 (aperture stop) | ∞ | −0.06 | | | 0.74 |
| 2* | 1.555 | 0.57 | 1.54470 | 56.2 | 0.76 |
| 3* | −7.560 | 0.05 | | | 0.78 |
| 4* | 1000.000 | 0.27 | 1.63470 | 23.9 | 0.77 |
| 5* | 2.506 | 0.37 | | | 0.80 |
| 6* | 3.427 | 0.32 | 1.63470 | 23.9 | 1.00 |
| 7* | 3.343 | 0.40 | | | 1.21 |
| 8* | −84.920 | 0.76 | 1.54470 | 56.2 | 1.55 |
| 9* | −1.072 | 0.25 | | | 1.81 |
| 10* | −1.872 | 0.42 | 1.53050 | 55.7 | 2.19 |
| 11* | 1.734 | 0.27 | | | 2.46 |
| 12 | ∞ | 0.25 | 1.51630 | 64.1 | 3.00 |
| 13 | ∞ | | | | 3.00 |
| image plane | ∞ | | | | |

Aspherical Surface Data

Second surface

K = −0.39938E+00, A4 = −0.12568E−01, A6 = −0.32062E−01,
A8 = −0.49203E−01, A10 = −0.86832E−02. A12 = −0.11797E−01,
A14 = −0.72092E−01

-continued

Unit: mm

Third surface

K = −0.18775E+02, A4 = −0.64618E−02, A6 = −0.11427E+00,
A8 = 0.42607E−01, A10 = −0.69959E−01, A12 = −0.75511E−01,
A14 = 0.12356E+00
Fourth surface K = −0.30000E+02, A4 = 0.36362E−01, A6 = 0.95812E−01,
A8 = −0.17117E+00, A10 = 0.52537E−01, A12 = 0.18428E+00,
A14 = −0.83823E−01
Fifth surface K = −0.85571E+01, A4 = 0.81278E−01, A6 = 0.95732E−01,
A8 = 0.30933E−01, A10 = −0.69323E−01, A12 = −0.91683E−01,
A14 = 0.18502E+00
Sixth surface K = −0.88698E+01, A4 = −0.17474E+00, A6 = 0.59527E−01,
A8 = 0.18891E−01, A10 = −0.48120E−01, A12 = 0.72968E−01,
A14 = −0.50146E−01
Seventh surface K = −0.30000E+02, A4 = −0.83587E−01, A6 = −0.15216E−01,
A8 = 0.11033E−01, A10 = 0.18902E−01, A12 = 0.48781E−02,
A14 = −0.71767E−02
Eighth surface K = 0.30000E+02, A4 = −0.40714E−01, A6 = 0.42493E−01,
A8 = −0.36558E−01, A10 = −0.32573E−02, A12 = 0.10522E−01,
A14 = −0.22728E−02
Ninth surface K = −0.37698E+01, A4 = −0.25817E−01, A6 = 0.58619E−01,
A8 = −0.20652E−01, A10 = −0.81155E−03, A12 = 0.14427E−02,
A14 = −0.17503E−03
Tenth surface K = −0.85287E+01, A4 = −0.60026E−01, A6 = 0.18154E−01,
A8 = 0.35971E−03, A10 = −0.40624E−03, A12 = −0.36965E−05,
A14 = 0.47691E−05
Eleventh surface K = −0.11337E+02, A4 = −0.60468E−01, A6 = 0.18493E−01,
A8 = −0.42647E−02, A10 = 0.38345E−03, A12 = −0.13223E−04,
A14 = 0.97759E−06

Various Data

| | |
|---|---|
| focal length (f) | 3.57 (mm) |
| F-number (Fno) | 2.41 |
| diagonal length (2Y) of imaging surface | 5.71 (mm) |
| back focus (Bf) | 0.39 (mm) |
| total length (TL) of lens system | 0.76 (mm) |
| ENTP | 0 (mm) |
| EXTP | −2.11 (mm) |
| H1 | −1.54 (mm) |
| H2 | −3.18 (mm) |

Focal length (mm) of each lens element

| | |
|---|---|
| first lens element L1 | 2.422 |
| second lens element L2 | −3.958 |
| third lens element L3 | 451.711 |
| fourth lens element L4 | 1.987 |
| fifth lens element L5 | −1.631 |

Construction data of the respective lens elements in the imaging optical system 1G as Example 7 is as follows.

Numerical Value Example 7

Unit: mm

Lens Surface Data

| lens surface | r | d | nd | vd | ER |
|---|---|---|---|---|---|
| object plane | ∞ | ∞ | | | |
| 1 (aperture stop) | ∞ | −0.05 | | | 0.74 |
| 2* | 1.775 | 0.55 | 1.54470 | 56.2 | 0.76 |
| 3* | −6.962 | 0.05 | | | 0.80 |
| 4* | 7.465 | 0.27 | 1.63470 | 23.9 | 0.80 |
| 5* | 1.893 | 0.34 | | | 0.85 |
| 6* | 5.646 | 0.49 | 1.54470 | 56.2 | 1.06 |
| 7* | ∞ | 0.50 | | | 1.12 |
| 8* | 22.225 | 0.59 | 1.54470 | 56.2 | 1.38 |
| 9* | −0.980 | 0.18 | | | 1.72 |
| 10* | −1.165 | 0.42 | 1.53180 | 56.0 | 1.89 |
| 11* | 1.865 | 0.34 | | | 2.32 |
| 12 | ∞ | 0.25 | 1.51630 | 64.1 | 3.00 |
| 13 | ∞ | | | | 3.00 |
| image plane | ∞ | | | | |

Aspherical Surface Data

Second surface

K = −0.71209E+00, A4 = −0.15170E−01, A6 = −0.71777E−02,
A8 = −0.13601E+00, A10 = 0.20365E+00, A12 = −0.18133E+00
Third surface K = −0.30000E+02, A4 = −0.29776E−01, A6 = 0.47214E−01,
A8 = −0.25624E+00, A10 = 0.16498E+00
Fourth surface K = 0.37860E+01, A4 = −0.59407E−01, A6 = 0.24715E+00,
A8 = −0.41823E+00, A10 = 0.28052E+00
Fifth surface K = −0.10339E+02, A4 = 0.84608E−01, A6 = 0.46260E−01,
A8 == 0.33624E−02, A10 = −0.10342E+00, A12 = 0.10504E+00
Sixth surface K = −0.30000E+02, A4 = −0.10882E+00, A6 = 0.53172E−01,
A8 = −0.39855E−01, A10 = 0.44946E−01, A12 = 0.68781E−01,
A14 = −0.45098E−01
Seventh surface A4 = −0.14080E+00, A6 = 0.15209E−01, A8 = −0.15404E−01,
A10 = 0.10995E−01, A12 = 0.11597E−01, A14 = 0.13743E−01,
A16 = −0.13290E−02
Eighth surface K = −0.20591E+02, A4 = −0.10562E+00, A6 = 0.49520E−02,
A8 = 0.16683E−02, A10 = −0.24891E−01, A12 = 0.52474E−02,
A14 = 0.82086E−02, A16 = −0.25647E−02
Ninth surface K = −0.48242E+01, A4 = −0.81499E−01, A6 = 0.75835E−01,
A8 = −0.15107E−01, A10 = −0.13750E−02, A12 = 0.42605E−03,
A14 = 0.16607E−03, A16 = −0.53374E−04
Tenth surface K = −0.54036E+01, A4 = −0.71496E−01, A6 = 0.31716E−01,
A8 = 0.12063E−02, A10 = −0.11051E−02, A12 = −0.11559E−03,
A14 = 0.31041E−04, A16 = 0.48259E−07
Eleventh surface K = −0.18916E+02, A4 = −0.32296E−01, A6 = 0.66562E−02,
A8 = −0.30215E−02, A10 = 0.56498E−03, A12 = −0.26040E−04,
A14 = −0.77737E−05, A16 = 0.10248E−05

Various Data

| focal length (f) | 3.56 (mm) |
|---|---|
| F-number (Fno) | 2.4 |
| diagonal length (2Y) of imaging surface | 5.71 (mm) |
| back focus (Bf) | 0.35 (mm) |
| total length (TL) of lens system | 0.74 (mm) |

Unit: mm

| ENTP | 0 (mm) |
|---|---|
| EXTP | −2.12 (mm) |
| H1 | −1.56 (mm) |
| H2 | −3.21 (mm) |

Focal length (mm) of each lens element

| first lens element L1 | 2.655 |
|---|---|
| second lens element L2 | −4.074 |
| third lens element L3 | 10.366 |
| fourth lens element L4 | 1.738 |
| fifth lens element L5 | −1.286 |

Construction data of the respective lens elements in the imaging optical system 1H as Example 8 is as follows.

Numerical Value Example 8

Unit: mm

Lens Surface Data

| lens surface | r | d | nd | vd | ER |
|---|---|---|---|---|---|
| object plane | ∞ | ∞ | | | |
| 1 (aperture stop) | ∞ | −0.02 | | | 0.84 |
| 2* | 1.881 | 0.61 | 1.54470 | 56.2 | 0.92 |
| 3* | −15.300 | 0.05 | | | 0.97 |
| 4* | 7.253 | 0.28 | 1.63470 | 23.9 | 0.98 |
| 5* | 2.112 | 0.37 | | | 1.01 |
| 6* | 6.648 | 0.52 | 1.54470 | 56.2 | 1.20 |
| 7* | ∞ | 0.56 | | | 1.25 |
| 8* | 75.809 | 0.81 | 1.54470 | 56.2 | 1.66 |
| 9* | −1.034 | 0.20 | | | 2.07 |
| 10* | −1.419 | 0.42 | 1.53180 | 56.0 | 2.35 |
| 11* | 1.832 | 0.46 | | | 2.70 |
| 12 | ∞ | 0.11 | 1.51630 | 64.1 | 3.30 |
| 13 | ∞ | | | | 3.30 |
| image plane | ∞ | | | | |

Aspherical Surface Data

Second surface

K = −0.40727E+00, A4 = −0.44823E−02, A6 = 0.20164E−02,
A8 = −0.55172E−01, A10 = 0.59655E−01, A12 = −0.44215E−01
Third surface K = −0.30000E+02, A4 = −0.21465E−01, A6 = 0.11882E−01,
A8 = −0.91243E−01, A10 = 0.39866E−01A
Fourth surface K = −0.27166E+02, A4 = −0.58247E−01, A6 = 0.12451E+00,
A8 = −0.18171E+00, A10 = 0.97402E−01
Fifth surface K = −0.93951E+01, A4 = 0.49348E−01, A6 = 0.23325E−01,
A8 = 0.70558E−02, A10 = −0.30175E−01, A12 = 0.21252E−01
Sixth surface K = −0.16010E+02, A4 = −0.75681E−01, A6 = 0.27752E−01,
A8 = −0.14664E−01, A10 = 0.17377E−01, A12 = 0.16911E−01,
A14 = −0.96134E−02
Seventh surface A4 = −0.87570E−01, A6 = 0.71198E−02, A8 = −0.46120E−02,
A10 = 0.45812E−02, A12 = 0.26648E−02, A14 = 0.23086E−02,
A16 = 0.13075E−03
Eighth surface K = −0.30000E+02, A4 = −0.60395E−01, A6 = 0.45548E−02,
A8 = 0.34199E−02, A10 = −0.78718E−02, A12 = 0.97665E−03,
A14 = 0.14678E−02, A16 = −0.35112E−03

-continued

Unit: mm

Ninth surface

K = −0.43352E+01, A4 = −0.52627E−01, A6 = 0.40367E−01,
A8 = −0.62722E−02, A10 = −0.48695E−03, A12 = 0.97082E−04,
A14 = 0.32418E−04, A16 = −0.68061E−05

Tenth surface

K = −0.56728E+01, A4 = −0.51415E−01, A6 = 0.16543E−01,
A8 = 0.49346E−03, A10 = −0.34015E−03, A12 = −0.25670E−04,
A14 = 0.59281E−05, A16 = 0.20149E−07

Eleventh surface

K = −0.16857E+02, A4 = −0.28576E−01, A6 = 0.53054E−02,
A8 = −0.12916E−02, A10 = 0.16671E−03, A12 = −0.64299E−05,
A14 = −0.14109E−05, A16 = 0.16230E−06

Various Data

| | |
|---|---|
| focal length (f) | 4.04 (mm) |
| F-number (Fno) | 2.4 |
| diagonal length (2Y) of imaging surface | 6.496 (mm) |
| back focus (Bf) | 0.5 (mm) |
| total length (TL) of lens system | 0.75 (mm) |
| ENTP | 0 (mm) |
| EXTP | −2.4 (mm) |
| H1 | −1.59 (mm) |
| H2 | −3.54 (mm) |

Focal length (mm) of each lens element

| | |
|---|---|
| first lens element L1 | 3.114 |
| second lens element L2 | −4.796 |
| third lens element L3 | 12.205 |
| fourth lens element L4 | 1.879 |
| fifth lens element L5 | −1.439 |

Construction data of the respective lens elements in the imaging optical system 1I as Example 9 is as follows.

Numerical Value Example 9

Unit: mm

Lens Surface Data

| lens surface | r | d | nd | vd | ER |
|---|---|---|---|---|---|
| object plane | ∞ | ∞ | | | |
| 1 (aperture stop) | ∞ | −0.11 | | | 0.77 |
| 2* | 1.417 | 0.61 | 1.54470 | 56.2 | 0.79 |
| 3* | −35.430 | 0.05 | | | 0.81 |
| 4* | −28.722 | 0.27 | 1.63470 | 23.9 | 0.80 |
| 5* | 3.392 | 0.38 | | | 0.81 |
| 6* | 3.767 | 0.32 | 1.63470 | 23.9 | 0.96 |
| 7* | 3.517 | 0.39 | | | 1.20 |
| 8* | −10.152 | 0.69 | 1.54470 | 56.2 | 1.52 |
| 9* | −1.053 | 0.24 | | | 1.73 |
| 10* | −1.549 | 0.45 | 1.53050 | 55.7 | 2.07 |
| 11* | 2.280 | 0.26 | | | 2.36 |
| 12 | ∞ | 0.25 | 1.51630 | 64.1 | 3.00 |
| 13 | ∞ | | | | 3.00 |
| image plane | ∞ | | | | |

Aspherical Surface Data

Second surface

K = −0.24817E+00, A4 = −0.74772E−02, A6 = −0.13529E−01,
A8 = −0.57476E−01, A10 = 0.23789E−01, A12 = 0.14248E−01,
A14 = −0.13426E+00

Third surface

K = 0.30000E+02, A4 = −0.31234E−01, A6 = −0.91389E−01,
A8 = 0.45309E−01, A10 = −0.63182E−01, A12 = −0.68757E−01,
A14 = 0.62023E−01

Fourth surface

K = −0.30000E+02, A4 = 0.40655E−01, A6 = 0.71909E−01,
A8 = −0.12072E+00, A10 = 0.50445E−01, A12 = 0.10934E+00,
A14 = −0.40829E−01

Fifth surface

K = −0.81961E+01, A4 = 0.97525E−01, A6 = 0.10268E+00,
A8 = −0.25257E−02, A10 = −0.20555E−01, A12 = 0.17001E−01,
A14 = 0.12224E+00

Sixth surface

K = −0.56859E+01, A4 = −0.18443E+00, A6 = 0.26593E−01,
A8 = −0.54674E−03, A10 = −0.34613E−01, A12 = 0.71971E−01,
A14 = −0.71770E−01

Seventh surface

K = −0.29555E+02, A4 = −0.74031E−01, A6 = −0.41076E−01,
A8 = 0.14762E−01, A10 = 0.16503E−01, A12 = 0.15105E−02,
A14 = −0.38687E−02

Eighth surface

K = 0.28962E+02, A4 = −0.18975E−01, A6 = 0.36966E−01,
A8 = −0.38773E−01, A10 = −0.25399E−02, A12 = 0.11120E−01,
A14 = −0.23734E−02

Ninth surface

K = −0.27231E+01, A4 = 0.14649E−02, A6 = 0.56088E−01,
A8 = −0.22148E−01, A10 = −0.93069E−03, A12 = 0.14327E−02,
A14 = −0.12286E−03

Tenth surface

K = −0.55672E+01, A4 = −0.54516E−01, A6 = 0.18814E−01,
A8 = 0.36267E−03, A10 = −0.42331E−03, A12 = −0.70943E−05,
A14 = 0.53946E−05

Eleventh surface

K = −0.13816E+02, A4 = −0.64542E−01, A6 = 0.18620E−01,
A8 = −0.43960E−02, A10 = 0.39423E−03, A12 = −0.12358E−04,
A14 = 0.14789E−05

Various Data

| | |
|---|---|
| focal length (f) | 3.71 (mm) |
| F-number (Fno) | 2.4 |
| diagonal length (2Y) of imaging surface | 5.71 (mm) |
| back focus (Bf) | 0.39 (mm) |
| total length (TL) of lens system | 0.74 (mm) |
| ENTP | 0 (mm) |
| EXTP | −2.1 (mm) |
| H1 | −1.8 (mm) |
| H2 | −3.31 (mm) |

Focal length (mm) of each lens element

| | |
|---|---|
| first lens element L1 | 2.516 |
| second lens element L2 | −4.764 |
| third lens element L3 | −166.815 |
| fourth lens element L4 | 2.102 |
| fifth lens element L5 | −1.671 |

The total length (TL) of the lens system in the aforementioned construction data is the total length of the lens system (corresponding to the distance from the object-side surface of the first lens element to the imaging surface) in the case where the object is located at an infinite distance. ENTP indicates a distance from the entrance pupil to the first surface (aperture stop). In the examples, since the entrance pupil corresponds to the aperture stop, ENTP is zero. EXTP indicates a distance from the image plane to the exit pupil, H1 indicates a distance from the first surface (aperture stop) to the object side principal point, and H2 indicates a distance from the final surface (corresponding to the image-side surface of the cover glass) to the image side principal point.

In the aforementioned surface data, the lens surface No. corresponds to the number "i" in the symbol "ri" (i=1, 2, 3, attached to each of the lens surfaces shown in FIGS. 6 to 14. The surface attached with the asterisk "*" to the number "i" indicates an aspherical surface (a dioptric surface having an aspherical configuration, or a surface having a refractive function substantially equivalent to an aspherical surface).

Further, "r" denotes a curvature radius (unit: mm) of each surface, "d" denotes a lens surface interval on an optical axis (on-axis surface interval) in an infinity in-focus state (a focus state at an infinite distance), "nd" denotes a refractive index of each lens element with respect to d-line (wavelength: 587.56 nm), "vd" denotes an Abbe number, and "ER" denotes an effective radius (mm). Since the surface of the optical diaphragm ST, both surfaces of the parallel plate FT, and the light receiving surface of the imaging element SR are flat surfaces, curvature radii of these surfaces are ∞ (infinite).

The aforementioned aspherical surface data shows the values of a second-order curved surface parameter (conical coefficient K) and of an aspherical coefficient Ai (i=4, 6, 8, 10, 12, 14, 16) of each surface defined as an aspherical surface (surface attached with the asterisk "*" to the number "i" in the surface data).

In each of Examples 1 to 9, the aspherical configuration is defined by the following formula, assuming that a surface vertex is the point of origin, X-axis coincides with the optical axis direction, and h denotes a height in a direction perpendicular to the optical axis.

$$X = (h^2/R)/[1+(1-(1+K)h^2/R^2)^{1/2}] + \Sigma A_i \cdot h^i$$

where
Ai: an i-th order aspherical coefficient,
R: a reference curvature radius, and
K: a conical coefficient.

Regarding paraxial curvature radii (r) described in the claims, in the embodiment, and in Examples 1 to 9, in actual lens measurement, it is possible to regard an approximate curvature radius obtained by processing a shape measurement value of a vicinity of the lens center (more specifically, a shape measurement value of a center area corresponding to 10% or less with respect to the lens outer diameter) with use of a least square algorithm, as a paraxial curvature radius. Further, in the case where a second-order aspherical coefficient is employed, it is possible to regard a curvature radius, taking into consideration of a second-order aspherical coefficient on the basis of a reference curvature radius described in a definition expression defining an aspherical surface, as a paraxial curvature radius (see e.g. pp. 41-42 of "Lens Design Method" by Yoshiya MATSUI (published by Kyoritsu Shuppan) as a reference document).

In the aforementioned aspherical surface data, the symbol "En" means ten to the power of n. For instance, "E+001" means ten to the power of +1, and "E-003" means ten to the power of −3.

The respective aberrations of the imaging optical systems 1A to 1I as Examples 1 to 9 having the aforementioned lens arrangement and construction are shown in FIGS. 15A to 32B.

FIGS. 15A to 15C, FIGS. 17A to 17C, FIGS. 19A to 19C, FIGS. 21A to 21C, FIGS. 23A to 23C, FIGS. 25A to 25C, FIGS. 27A to 27C, FIG. 29A to FIG. 29C, and FIGS. 31A to 31C are aberration diagrams at an infinite distance. FIGS. 15A, 17A, 19A, 21A, 23A, 25A, 27A, 29A, and 31A show longitudinal spherical aberrations (sine condition), FIGS. 15B, 17B, 19B, 21B, 23B, 25B, 27B, 29B, and 31B show astigmatism field curves, and FIGS. 15C, 17C, 19C, 21C, 23C, 25C, 27C, 29C, and 31C show distortions. A horizontal axis in the spherical aberration diagrams represents a focus position deviation in mm, and a vertical axis therein represents a normalized value at a maximum incident height. A horizontal axis in the astigmatism diagrams represents a focus position deviation in mm, and a vertical axis therein represents an image height in mm. A horizontal axis in the distortion diagrams represents a ratio (%) of an actual image height to an ideal image height, and a vertical axis therein represents an image height in mm. In the spherical aberration diagrams, the solid line represents a result regarding d-line (wavelength: 587.56 nm), and the broken line represents a result regarding g-line (wavelength: 435.84 nm), respectively. In the astigmatism diagrams, the broken line and the solid line respectively represent results regarding a tangential (meridional) surface (T) and a sagittal (radial) surface (S). The astigmatism diagrams and the distortion diagrams show results in the case of using d-line (wavelength: 587.56 nm).

FIGS. 16A and 16B, FIGS. 18A and 18B, FIGS. 20A and 20B, FIGS. 22A and 22B, FIGS. 24A and 24B, FIGS. 26A and 26B, FIGS. 28A and 28B, FIGS. 30A and 30B, and FIGS. 32A and 32B are transverse aberration diagrams (meridional coma aberration). FIGS. 16A, 18A, 20A, 22A, 24A, 26A, 28A, 30A, and 32A show a case of Y where Y is equal to a maximum image height; and FIGS. 16B, 18B, 20B, 22B, 24B, 26B, 28B, 30B, and 32B show a case of Y where Y is equal to 50% of the maximum image height. A horizontal axis in the diagrams represents an entrance pupil position in mm, and a vertical axis therein represents lateral aberration. In the lateral aberration diagrams, the solid line represents a result regarding d-line, and the broken line represents a result regarding g-line, respectively.

Table 1 shows values of the conditional expressions (1) to (10) in the case where the conditional expressions (1) to (10) are applied to the imaging optical systems 1A to 1I as Examples 1 to 9 as described above. Table 1 also shows the total length (L/Y) in Examples 1 to 9.

TABLE 1

| Conditional expression | | Ex1 | Ex2 | Ex3 | Ex4 | Ex5 | Ex6 | Ex7 | Ex8 | Ex9 |
|---|---|---|---|---|---|---|---|---|---|---|
| (1) | f123/f | 1.11 | 1.15 | 1.21 | 1.12 | 1.24 | 1.17 | 1.11 | 1.14 | 1.14 |
| (2) | d6/f | 0.12 | 0.12 | 0.12 | 0.14 | 0.11 | 0.12 | 0.14 | 0.14 | 0.11 |
| (3) | f4/f | 0.57 | 0.62 | 0.66 | 0.58 | 0.56 | 0.55 | 0.49 | 0.47 | 0.47 |
| (4) | (R41 + R42)/(R41 − R42) | 1.27 | 1.41 | 1.24 | 1.39 | 1.03 | 1.27 | 0.92 | 0.97 | 1.23 |
| (5) | f1/f | 0.69 | 0.74 | 0.73 | 0.68 | 0.68 | 0.69 | 0.75 | 0.77 | 0.68 |
| (6) | f3/f | 12.55 | 13.95 | 20.06 | 6.79 | 126.45 | 8.31 | 2.92 | 3.03 | −45.01 |
| (7) | vd3 | 23.87 | 23.87 | 23.87 | 23.87 | 23.87 | 23.87 | 56.15 | 56.15 | 23.87 |
| (8) | |f3/f| | 12.55 | 13.95 | 20.06 | 6.79 | 126.45 | 8.31 | 2.92 | 3.03 | 45.01 |
| (9) | Nd3 | 1.63 | 1.63 | 1.63 | 1.63 | 1.63 | 1.63 | 1.54 | 1.54 | 1.63 |

TABLE 1-continued

| Conditional expression | Ex1 | Ex2 | Ex3 | Ex4 | Ex5 | Ex6 | Ex7 | Ex8 | Ex9 |
|---|---|---|---|---|---|---|---|---|---|
| (10) f5/f | −0.45 | −0.49 | −0.53 | −0.44 | −0.46 | −0.45 | −0.36 | −0.36 | −0.36 |
| L/2Y | 0.74 | 0.75 | 0.76 | 0.75 | 0.74 | 0.76 | 0.74 | 0.75 | 0.74 |

As described above, each of the imaging optical systems 1A to 1I as Examples 1 to 9 is provided with five lens elements, and satisfies the aforementioned conditions. Thus, the imaging optical systems 1A to 1I can advantageously correct various aberrations in a satisfactory manner, while achieving miniaturization, as compared with a conventional optical system. Further, the imaging optical systems 1A to 1I as Examples 1 to 9 can sufficiently achieve miniaturization, when loaded in the imaging device 21 and in the digital apparatus 3, particularly when loaded in the mobile phone 5. Further, it is possible to apply the imaging optical systems 1A to 1I to a high-pixel imaging element 18.

For instance, in a high-pixel imaging element 18 having pixels in the range from about 8M to 16M pixels e.g. 8 megapixels, 10 megapixels or 16 megapixels, in the case where the size of the imaging element 18 is fixed, the pixel pitch is narrowed (the pixel area is reduced), as compared with a conventional imaging element. As a result, the imaging optical systems 1A to 1I require a resolution in accordance with the narrowed pixel pitch. In the case where the imaging optical system 1 is evaluated in terms of intended resolution, for instance, in terms of MTF (modulation transfer function), it is necessary to suppress various aberrations in a predetermined range defined by e.g. the device specifications. In the imaging optical systems 1A to 1I as Examples 1 to 9, various aberrations are suppressed in the respective predetermined ranges, as shown in the aberration diagrams. Thus, in the imaging optical system 1A to 1I as Examples 1 to 9, various aberrations are corrected in a satisfactory manner. Accordingly, the imaging optical systems 1A to 1I are advantageously used for the imaging element 18 having pixels in the range from e.g. 8M to 16M pixels.

The specification discloses the aforementioned configurations. The following is a summary of the primary configurations of the embodiment.

An imaging optical system according to an aspect is provided with, in the order from an object side to an image side, a first lens element having a positive refractive power; a second lens element having a negative refractive power and having a surface concave toward the image side; a third lens element having a positive or negative refractive power; a fourth lens element having a positive refractive power and having a surface convex toward the image side; and a fifth lens element having a negative refractive power. The imaging optical system satisfies the aforementioned conditional expressions (1) to (3).

The imaging optical system having the above configuration is provided with a telephoto lens system configured such that a positive lens group constituted of the first lens element, the second lens element, the third lens element and the fourth lens element; and the negative fifth lens element are disposed in this order from the object side. The imaging optical system having the above configuration is advantageous in shortening the total length of the imaging optical system. Setting two or more lens elements out of the five lens elements as negative lens elements makes it possible to increase the number of lens surfaces capable of diverging light. Thus, the imaging optical system having the above configuration makes it easy to correct a Petzval sum, and makes it possible to secure good image forming performance up to a peripheral portion of a screen.

Further, the imaging optical system having the above configuration is provided with the fourth lens element, which is a lens element having a positive refractive power and having a convex surface toward the image side. Accordingly, it is possible to guide an off-axis light ray emanating from the second lens element at a large angle to the fifth lens element, while suppressing an increase in the refraction angle. Thus, the above configuration is advantageous in suppressing off-axis aberration in a satisfactory manner.

Further, the imaging optical system having the above configuration makes it possible to prevent an excessive increase in chromatic aberration by controlling the value of the conditional expression (1) so as not to fall below the lower limit of the conditional expression (1). On the other hand, the imaging optical system having the above configuration makes it possible to shorten the total length of the imaging optical system by controlling the value of the conditional expression (1) so as not to exceed the upper limit of the conditional expression (1). Further, the imaging optical system having the above configuration makes it possible to effectively separate an on-axis light ray and an off-axis light ray outputted from the third lens element from each other, and makes it possible to correct off-axis aberration by the fourth lens element in a satisfactory manner by controlling the value of the conditional expression (2) so as not to fall below the lower limit of the conditional expression (2). On the other hand, the imaging optical system having the above configuration makes it possible to shorten the total length of the imaging optical system by controlling the value of the conditional expression (2) so as not to exceed the upper limit of the conditional expression (2). Further, the imaging optical system having the above configuration makes it possible to suppress coma aberration generated on the fourth lens element, while suppressing an excessive increase in the optical power of the fourth lens element by controlling the value of the conditional expression (3) so as not to fall below the lower limit of the conditional expression (3). On the other hand, the imaging optical system having the above configuration makes it possible to shorten the total length of the imaging optical system by controlling the value of the conditional expression (3) so as not to exceed the upper limit of the conditional expression (3).

Accordingly, the imaging optical system having the above configuration is advantageous in correcting various aberrations in a satisfactory manner, while achieving ultra-miniaturization, with use of the five lens elements.

Further, in the imaging optical system, the fourth lens element may satisfy the aforementioned conditional expression (4).

The imaging optical system having the above configuration makes it possible to correct spherical aberration by controlling the value of the conditional expression (4) so as not to exceed the upper limit of the conditional expression (4). On the other hand, the imaging optical system having the above configuration makes it possible to guide an off-axis light ray emanating from the second lens element at a large angle to the fifth lens element, while suppressing an increase in the refraction angle at each of the lens surfaces by controlling the value of the conditional expression (4) so as not to fall below the lower limit of the conditional expression (4). Thus, the above configuration is advantageous in suppressing off-axis aberration in a satisfactory manner.

Further, in the imaging optical system having the above configurations, the focal length of the first lens element may satisfy the aforementioned conditional expression (5).

The imaging optical system having the above configuration makes it possible to appropriately maintain the refractive power of the first lens element, and makes it possible to set the combined principal point position of the lens elements from the first lens element to the fourth lens element at a position closer to the object side. This is advantageous in shortening the total length of the imaging optical system. On the other hand, the imaging optical system having the above configuration makes it possible to suppress an excessive increase in the refractive power of the first lens element, and makes it possible to suppress high-order spherical aberration or coma aberration which may be generated on the first lens element by controlling the value of the conditional expression (5) so as not to fall below the lower limit of the conditional expression (5).

Further, in the imaging optical system having the above configurations, the third lens element may satisfy the aforementioned conditional expressions (6) and (7).

The imaging optical system having the above configuration makes it possible to shorten the total length of the entirety of the imaging optical system by controlling the value of the conditional expression (6) to satisfy the conditional expression (6). Further, the imaging optical system having the above configuration makes it possible to suppress generation of chromatic aberration by controlling the value of the conditional expression (7) so as not to fall below the lower limit of the conditional expression (7). On the other hand, the imaging optical system having the above configuration makes it possible to suppress an increase in the cost resulting from use of a special material by controlling the value of the conditional expression (7) so as not to exceed the upper limit of the conditional expression (7).

Further, in the imaging optical system having the above configuration, the third lens element may satisfy the aforementioned conditional expressions (8) and (9).

The imaging optical system having the above configuration makes it possible to suppress an increase in the cost resulting from use of a special material by controlling the value of the conditional expression (8) and the value of the conditional expression (9) to satisfy the respective conditional expressions (8) and (9).

Further, in the imaging optical system having the above configurations, the third lens element may have a positive refractive power in a paraxial region thereof.

In the imaging optical system having the above configuration, the lens system has a triplet configuration such that the first to third lens elements respectively have a positive refractive power, a negative refractive power, and a positive refractive power in this order. The imaging optical system having the above configuration is advantageous is correcting various aberrations in a satisfactory manner.

Further, in the imaging optical system having the above configurations, the third lens element may have a convex surface toward the object side in a paraxial region thereof.

The imaging optical system having the above configuration makes it possible to set the combined principal point position of the lens elements from the first lens element to the third lens element at a position closer to the object side. This is advantageous in shortening the total length of the imaging optical system.

Further, in the imaging optical system having the above configurations, the focal length of the fifth lens element may satisfy the aforementioned conditional expression (10).

The imaging optical system having the above configuration makes it possible to prevent deterioration of telecentricity, while suppressing an excessive increase in the refractive power of the fifth lens element by controlling the value of the conditional expression (10) so as not to exceed the upper limit of the conditional expression (10). On the other hand, the imaging optical system having the above configuration makes it possible to appropriately maintain the refractive power of the fifth lens element by controlling the value of the conditional expression (1) so as not to fall below the lower limit of the conditional expression (10). This is advantageous in shortening the total length of the imaging optical system, while securing the back focal length of the imaging optical system.

Further, in the imaging optical system having the above configurations, the fifth lens element may have a surface concave toward the object side in a paraxial region thereof.

The imaging optical system having the above configuration makes it possible to guide an off-axis light ray emanating from the second lens element at a large angle to the fifth lens element, while suppressing an increase in the refraction angle. The above configuration is advantageous in suppressing off-axis aberration in a satisfactory manner.

Further, the imaging optical system having the above configurations may be further provided with an aperture stop disposed at a position closest to the object side.

The imaging optical system having the above configuration makes it possible to implement desirable telecentric characteristics by disposing the aperture stop at a position on the object side of the first lens element.

Further, the imaging optical system having the above configurations may be further provided with a light shielding plate which is disposed between the first lens element and the second lens element for shielding at least a part of diagonal light rays.

The imaging optical system having the above configuration makes it possible to prevent stray light, and makes it possible to shield upper rays by shielding at least a part of light rays diagonally incident on the imaging element with use of the light shielding plate between the first lens element and the second lens element. Thus, the above configuration is advantageous in improving coma aberration.

Further, in the imaging optical system having the above configurations, the fourth lens element may have an aspherical surface on at least one of an object-side surface and an image-side surface thereof, and a thickness of the fourth lens element may be changed in such a manner that the thickness decreases, as a distance from the optical axis increases toward an end of an effective region of the fourth lens element, and then increases.

The imaging optical system having the above configuration provides a positive refractive power in a paraxial region of the fourth lens element, and provides a negative refractive power in an off-axis region of the fourth lens element. Thus, the above configuration is advantageous in shortening the total length of the imaging optical system, while correcting field curvature.

Further, in the imaging optical system having the above configurations, all the first to fifth lens elements may be lens elements made of a resin material.

In recent years, there is an increasing demand for further miniaturization of the entirety of a solid-state imaging device. There has been developed a solid-state imaging device having a small pixel pitch and accordingly having a small imaging surface, with use of a solid-state imaging element having the same pixel number as a conventional imaging element. In an imaging optical system for use in such a solid-state imaging element having a small imaging surface, it is necessary to relatively shorten the focal length of the entire optical system. This results in a considerable reduction of the curvature radius or the outer diameter of each lens element. In the imaging optical system having the above configuration, all the lens elements are constituted of resin lens elements manufactured by injection molding. Accordingly, it is possible to mass-produce the imaging optical system at a low cost, regardless of use of the lens elements having a small curvature radius or outer diameter, as compared with an optical system incorporated with glass lens elements to be manufactured by a polishing process, which is cumbersome. Further, a resin lens element is advantageous in a point that the pressing temperature can be lowered. Accordingly, it is possible to suppress wear of a molding die. As a result, the number of times of replacing the molding die or the number of times of maintenance can be reduced. This is advantageous in suppressing the cost.

Further, an imaging device according to another aspect is provided with the imaging optical system having one of the above configurations, and an imaging element which converts an optical image into an electrical signal, wherein the imaging optical system is operable to form an optical image of an object on a light receiving surface of the imaging element.

According to the above configuration, it is possible to provide an imaging device incorporated with an imaging optical system provided with five lens elements and capable of correcting various aberrations in a satisfactory manner, while achieving miniaturization. Accordingly, the imaging device having the above configuration is advantageous in achieving miniaturization and high performance.

Further, a digital apparatus according to yet another aspect is provided with the aforementioned imaging device, and a control section which causes the imaging device to perform at least one of a still image photographing and a moving image photographing of the object, wherein the imaging optical system of the imaging device is assembled in such a manner as to form the optical image of the object on an imaging surface of the imaging element. Preferably, the digital apparatus may include a mobile terminal device.

According to the above configuration, it is possible to provide a digital apparatus or a mobile terminal device incorporated with an imaging optical system provided with five lens elements and capable of correcting various aberrations in a satisfactory manner, while achieving miniaturization. Accordingly, the digital apparatus or the mobile terminal device having the above configuration is advantageous in achieving miniaturization and high performance.

This application is based on Japanese Patent Application No. 2011-140638 filed on Jun. 24, 2011, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

Industrial Applicability

According to the invention, it is possible to provide an imaging optical system, an imaging device provided with the imaging optical system, and a digital apparatus loaded with the imaging device.

The invention claimed is:

1. An imaging optical system, comprising in the order from an object side to an image side:
a first lens element having a positive refractive power;
a second lens element having a negative refractive power;
a third lens element having a positive or negative refractive power;
a fourth lens element having a positive refractive power and having a surface convex toward the image side; and
a fifth lens element having a negative refractive power, wherein
the imaging optical system satisfies the following conditional expressions (3), (8) and (9):

$$0.30 < f4/f < 0.72 \quad (3)$$

$$5 < |f3/f| \quad (8)$$

$$1.57 < Nd3 < 1.67 \quad (9)$$

where
f: a focal length of an entirety of the imaging optical system,
f3: a focal length of the third lens element,
f4: a focal length of the fourth lens element, and
Nd3: a refractive index of the third lens element with respect to d-line.

2. The imaging optical system according to claim 1, wherein the imaging optical system satisfies the following conditional expression (11):

$$L/2Y < 0.8 \quad (11)$$

where
L: a distance on the optical axis from a lens surface of a lens element closest to the object side of the entirety of the imaging optical system to an image-side focal point, and
2Y: a diagonal length of an imaging surface.

3. The imaging optical system according to claim 1, wherein the imaging optical system satisfies the following conditional expression (11A):

$$L/2Y < 0.78 \quad (11A)$$

where
L: a distance on the optical axis from a lens surface of a lens element closest to the object side of the entirety of the imaging optical system to an image-side focal point, and
2Y: a diagonal length of an imaging surface.

4. The imaging optical system according to claim 1, wherein
the fourth lens element satisfies the following conditional expression (4):

$$0.8 < (R41+R42)/(R41-R42) < 1.5 \quad (4)$$

where
R41: a curvature radius of an object-side surface of the fourth lens element, and
R42: a curvature radius of an image-side surface of the fourth lens element.

5. The imaging optical system according to claim 1, wherein
a focal length of the first lens element satisfies the following conditional expression (5):

$$0.6 < f1/f < 0.8 \quad (5)$$

where
f1: the focal length of the first lens element.

6. The imaging optical system according to claim 1, wherein
the third lens element has a positive refractive power in a paraxial region thereof.

7. The imaging optical system according to claim 1, wherein
the third lens element has a surface convex toward the object side in a paraxial region thereof.

8. The imaging optical system according to claim 1, wherein
a focal length of the fifth lens element satisfies the following conditional expression (10):

$$-0.6 < f5/f < -0.3 \tag{10}$$

where
f5: the focal length of the fifth lens element.

9. The imaging optical system according to claim 1, wherein
the fifth lens element has a surface concave toward the object side in a paraxial region thereof.

10. The imaging optical system according to claim 1, further comprising:
an aperture stop disposed at a position closest to the object side.

11. The imaging optical system according to claim 1, further comprising:
a light shielding plate which is disposed between the first lens element and the second lens element for shielding at least a part of diagonal light rays.

12. The imaging optical system according to claim 1, wherein
the fourth lens element has an aspherical surface on at least one of an object-side surface and an image-side surface thereof, and a thickness of the fourth lens element is changed in such a manner that the thickness decreases, as a distance from the optical axis increases in a direction perpendicular to the optical axis of the fourth lens element, and then increases.

13. The imaging optical system according to claim 1, wherein
the second lens element has a surface concave toward the image side.

14. The imaging optical system according to claim 1, wherein the imaging optical system satisfies the following conditional expression (1):

$$1 < f123/f < 1.25 \tag{1}$$

where
f123: a combined focal length of the first lens element, the second lens element, and the third lens element.

15. The imaging optical system according to claim 1, wherein the imaging optical system satisfies the following conditional expression (2):

$$0.1 < d6/f < 0.15 \tag{2}$$

where
d6: a distance on an optical axis between the third lens element and the fourth lens element.

16. The imaging optical system according to claim 1, wherein
all the first to fifth lens elements are lens elements made of a resin material.

17. An imaging device, comprising:
the imaging optical system of claim 1; and
an imaging element which converts an optical image into an electrical signal, wherein
the imaging optical system is operable to form an optical image of an object on a light receiving surface of the imaging element.

18. A digital apparatus, comprising:
the imaging device of claim 17; and
a control section which causes the imaging device to perform at least one of a still image photographing and a moving image photographing of the object, wherein
the imaging optical system of the imaging device is assembled in such a manner as to form the optical image of the object on an imaging surface of the imaging element.

19. The digital apparatus according to claim 18, wherein the digital apparatus includes a mobile terminal device.

* * * * *